(12) United States Patent  (10) Patent No.: US 7,787,172 B2
Shirai et al.  (45) Date of Patent: Aug. 31, 2010

(54) GAMMA CORRECTION FOR ADJUSTABLE LIGHT SOURCE

(75) Inventors: Akira Shirai, Hino (JP); Hirokazu Nishino, Akishima (JP); Yoshiaki Horikawa, Hachioji (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 0 days.

(21) Appl. No.: 12/231,908

(22) Filed: Sep. 5, 2008

(65) Prior Publication Data

US 2009/0009850 A1 Jan. 8, 2009

Related U.S. Application Data

(63) Continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 60/967,953, filed on Sep. 6, 2007.

(51) Int. Cl.
*G02B 26/00* (2006.01)
*H04N 5/202* (2006.01)
*G03B 21/00* (2006.01)
*G09G 3/34* (2006.01)

(52) U.S. Cl. ........................ 359/292; 359/290; 359/298; 348/254; 348/759; 353/31; 345/84; 345/690

(58) Field of Classification Search ......... 359/290–293, 359/295, 298, 230, 634; 348/254, 255, 674, 348/675, 750, 756, 759, 764, 771; 345/84, 345/89, 204, 590, 596, 690; 353/20, 31, 353/33, 65, 69, 88, 121, 122
See application file for complete search history.

(56) References Cited

U.S. PATENT DOCUMENTS

| | | | |
|---|---|---|---|
| 3,553,352 A | 1/1971 | Neal et al. | |
| 3,745,408 A | 7/1973 | Emmons | |
| 5,214,420 A | 5/1993 | Thompson et al. | |
| 5,303,055 A | 4/1994 | Hendrix et al. | |
| 5,519,518 A * | 5/1996 | Watanabe et al. | 349/57 |
| 5,597,223 A * | 1/1997 | Watanabe et al. | 353/97 |
| 5,668,611 A | 9/1997 | Ernstoff et al. | |
| 6,034,660 A | 3/2000 | Millward et al. | |
| 6,184,852 B1 * | 2/2001 | Millward et al. | 345/84 |
| 6,870,523 B1 * | 3/2005 | Ben-David et al. | 345/84 |
| 6,943,836 B2 | 9/2005 | Kitagawa | |
| 6,977,647 B2 | 12/2005 | Park | |

(Continued)

*Primary Examiner*—Loha Ben
(74) *Attorney, Agent, or Firm*—Bo-In Lin

(57) ABSTRACT

The present invention provides a projection apparatus, that includes: a light source; a light source control unit for controlling the output of the light source; at least one spatial light modulator for modulating the illumination light from the light source by a plurality of pixel elements; and an optical system for projecting, onto a screen, the illumination light deflected by the spatial light modulator, wherein: the light source control unit performs a gamma (γ) correction on input image data by a modulation control of the light source.

29 Claims, 32 Drawing Sheets

U.S. PATENT DOCUMENTS

| | | |
|---|---|---|
| 7,042,523 B2 | 5/2006 | Haider et al. |
| 7,113,152 B2 * | 9/2006 | Ben-David et al. ............ 345/32 |
| 7,374,290 B2 * | 5/2008 | Sato ........................... 353/97 |
| 2002/0008712 A1 | 1/2002 | Shigeta |
| 2003/0112378 A1 | 6/2003 | Okunuki et al. |
| 2010/0128225 A1 * | 5/2010 | Nishino et al. ................ 353/31 |

* cited by examiner

Fig. 1A (Prior Art)
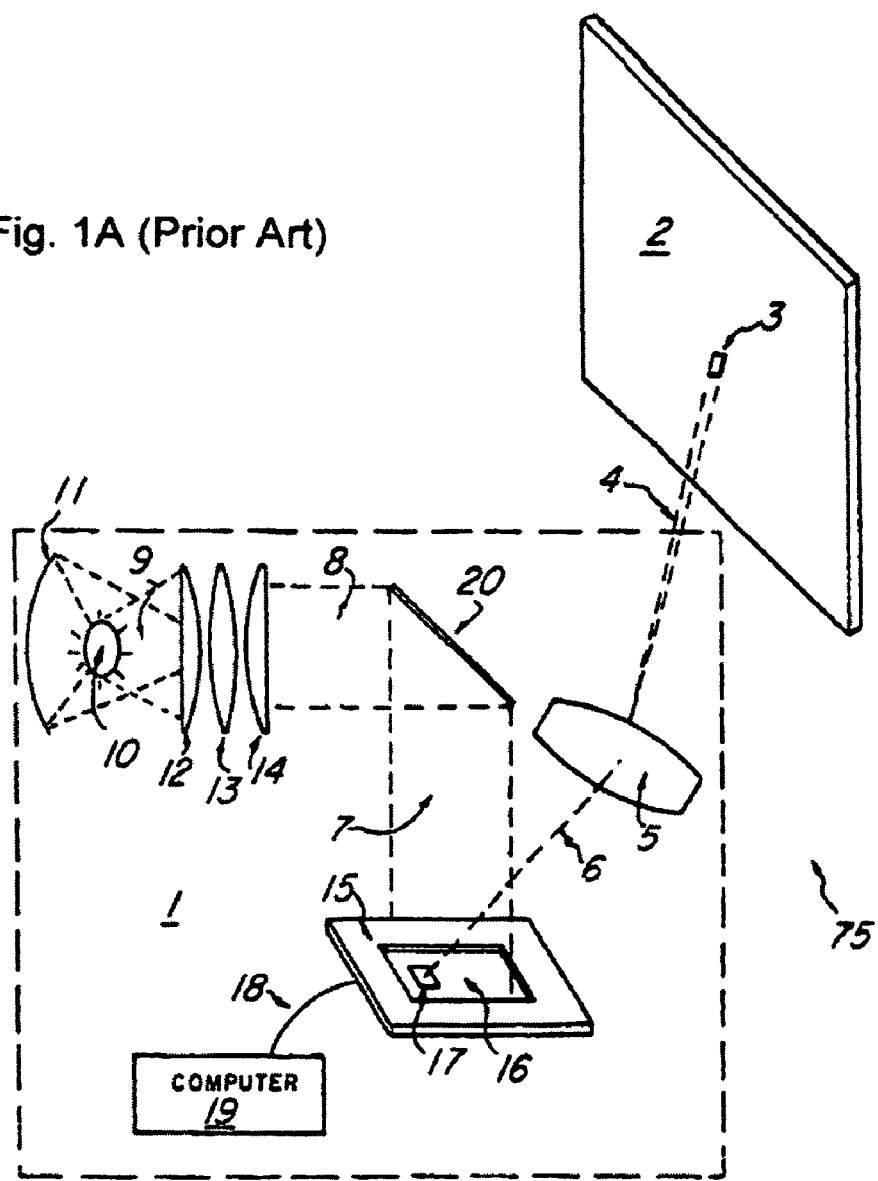
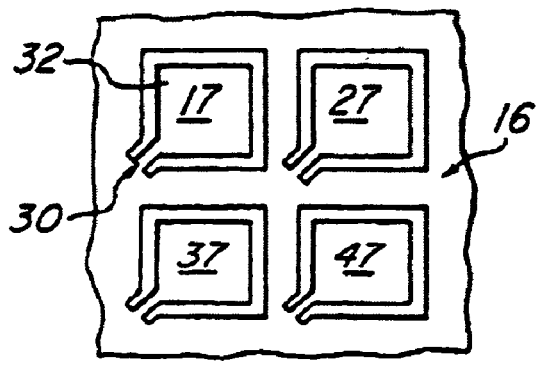
Fig. 1B (Prior Art)

Incident light

GAMMA CORRECTION FOR ADJUSTABLE LIGHT SOURCE

This is a Non-provisional application of a pending U.S. Patent Provisional Application No. 60/967,953 filed on Sep. 6, 2007. The Patent Application 60/967,953 is a Continuation In Part (CIP) Application of a U.S. patent application Ser. No. 11/121,543 filed on May 4, 2005 issued into U.S. Pat. No. 7,268,932. The application Ser. No. 11/121,543 is a Continuation In Part (CIP) Application of three previously filed Applications. These three Applications are Ser. No. 10/698,620 filed on Nov. 1, 2003 now abandoned, Ser. No. 10/699,140 filed on Nov. 1, 2003 now issued into U.S. Pat. No. 6,862,127, and Ser. No. 10/699,143 filed on Nov. 1, 2003 now issued into U.S. Pat. No. 6,903,860 by the Applicant of this Patent Applications. The disclosures made in these Patent Applications are hereby incorporated by reference in this Patent Application.

BACKGROUND OF THE INVENTION

1. Field of the Invention

The present invention relates generally to image projection apparatuses implemented with mirror devices functioning as a spatial light modulator (SLM). The present invention relate more particularly to an image projection apparatus implemented with mirror devices functioning as SLM to receive illumination light from a light source that includes a light control unit to modulate the illumination light to control the gray scale of an image projection with non-linear control processes.

2. Description of the Related Art

Even though there have been significant advances in recent years in the technology of implementing electromechanical micro-mirror devices as spatial light modulators, there are still limitations and difficulties when these are employed to display high quality images. Specifically, when an image is digitally controlled, the image quality is adversely affected because the image is not displayed with a sufficient number of gray scales.

Electromechanical micro-mirror devices have drawn considerable interest because of their application as spatial light modulators (SLMs). A spatial light modulator requires a relatively large number of micro-mirror devices. In general, the number of devices required ranges from 60,000 to several million for each SLM. Refer to FIG. 1A for a digital video system 1 as disclosed in a relevant U.S. Pat. No. 5,214,420, which includes a display screen 2. A light source 10 is used to generate light energy to illuminate display screen 2. Light 9 is further concentrated and directed toward lens 12 by mirror 11. Lens 12, 13, and 14 serve a combined function as a beam columnator to direct light 9 into a column of light 8. A spatial light modulator 15 is controlled by a computer through data transmitted over data cable 18 to selectively redirect a portion of the light from path 7 toward lens 5 to display on screen 2. The SLM 15 has a surface 16 that includes switchable reflective elements, e.g., micro-mirror devices 32 with elements 17, 27, 37, and 47 as reflective elements attached to a hinge 30, as shown in FIG. 1B. When element 17 is in one position, a portion of the light from path 7 is redirected along path 6 to lens 5 where it is enlarged or spread along path 4 to impinge the display screen 2 so as to form an illuminated pixel 3. When element 17 is in another position, light is not redirected toward display screen 2 and hence pixel 3 would be dark.

The on-and-off states of a micro-mirror control scheme, such as that implemented in the U.S. Pat. No. 5,214,420 and by most conventional display systems, limits image display quality. This is because the application of a conventional control circuit limits the gray scale (PWM between ON and OFF states) by the LSB (least significant bit, or the least pulse width). Due to the ON-OFF states implemented in conventional systems, there is no way to provide a pulse width shorter than the LSB. The least brightness, which determines the gray scale, is the light reflected during the least pulse width. A limited gray scale leads to lower image quality.

In FIG. 1C, a circuit diagram of a control circuit for a micro-mirror according to U.S. Pat. No. 5,285,407 is presented. The control circuit includes memory cell 32. Various transistors are referred to as "M*" where * designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads presented to memory cell 32. Memory cell 32 includes an access switch transistor M9 and a latch 32a, which is the basis of the static random access switch memory (SRAM) design. All access transistors M9 in a row receive a DATA signal from a different bit-line 31a. The particular memory cell 32 to be written is accessed by turning on the appropriate row select transistor M9, using the ROW signal functioning as a word-line. Latch 32a is formed from two cross-coupled inverters, M5/M6 and M7/M8, which permit two stable states. State 1 is Node A high and Node B low and state 2 is Node A low and Node B high.

The switching of the dual states, as illustrated by the control circuit, controls the micro-mirrors to position either at an ON or an OFF angular orientation, as shown in FIG. 1A. The brightness, i.e., the gray scales of display for a digitally control image system, is determined by the length of time the micro-mirror stays at an ON position. The length of time a micro-mirror is at an ON position is, in turn, controlled by a multiple bit word. FIG. 1D shows the resultant binary time intervals when the device is controlled by a four-bit word. As shown in FIG. 1D, the time durations have relative values of 1, 2, 4, and 8 that in turn define the relative brightness for each of the four bits where 1 is for the least significant bit and 8 is for the most significant bit. According to the control mechanism as shown, the minimum controllable differences between gray scales for showing different brightness is a brightness represented by the "least significant bit" that keeps the micro-mirror at an ON position.

For example, assuming n bits of gray scales, the frame time is divided into $2^n-1$ equal time periods. For a 16.7 milliseconds frame period and n-bit intensity values, the time period is $16.7/(2^n-1)$ milliseconds Having established these time slices for controlling the length of time for displaying each pixel in each frame, the pixel intensities are determined by the number of time slices represented by each bit. Specifically, a display of a black pixel is represented by 0 time slices. The intensity level represented by the LSB is 1 time slice, and maximum brightness is $2^n-1$ time slices. The number time slices that a micro mirror is controlled to operate at an On-state in a frame period determines a specifically quantified light intensity of each pixel corresponding to the micromirror reflecting a modulated light to that pixel. Thus, during a frame period, each pixel corresponding to a modulated micromirror controlled by a control word with a quantified value of more than 0 is operated at an on state for the number of time slices that correspond to the quantified value represented by the control word. The viewer's eye integrates the pixel brightness so that the image appears the same as if it were generated with analog levels of light.

For addressing deformable mirror devices, a pulse width modulator (PWM) receives the data formatted into "bit-planes". Each bit-plane corresponds to a bit weight of the intensity value. Thus, if each pixel's intensity is represented by an n-bit value, each frame of data has n bit-planes. Each bit-plane has a 0 or 1 value for each display element. In the example described in the preceding paragraphs, each bit-plane is separately loaded during a frame. The display elements are addressed according to their associated bit-plane values. For example, the bit-plane representing the LSBs of each pixel is displayed for 1 time period.

Projection apparatuses such as described above generally use a light source such as a high-pressure mercury lamp, a xenon lamp, or similar kinds of light sources. However, these types of light sources perform poorly in high-speed switching that alternates between the ON and OFF states. Accordingly, a light source is usually controlled to continuously operate in an ON state during the entire length of time when the projection apparatus is in operation. The light source that is continuously turned on generates a large amount of heat and wastes light and electricity.

There is also an increasing demand that projection apparatuses project images at a higher level of gray scale (gradation). Accordingly, a spatial light modulator has to be controlled to enable a projection apparatus to project images at a higher level of gray scale. However, the achievable improvement of the gray scale performance would be very limited if the improvements are to be achieved only through the control of the spatial light modulator limited. Some of the attempts to further improve the quality of image display have been disclosed in many Patents, such as U.S. Pat. Nos. 5,214,420, 5,285,407, and published Patent Applications. However, the disclosures including those included in the Information Disclosure Statement (IDS) have not provided effective solutions to resolve the above discussed difficulties and limitations.

Recent developments in image display technology; a so-called γ correction is performed when the cameras capture the images. The γ correction is carried out in order to take into account the projection characteristics of the CRT devices for displaying the image as the TV images projected from the CRT devices.

Therefore, the signal voltages E applied in the CRT devices for projecting the TV images have a functional relationship with the image projection output L represented by $L=E^\gamma$. In other words, the relationship when multiplied by a non-linear γ correction is non-linear. Also, in order to reduce the cost to the TV receivers as consumers, this γ correction is performed on the transmission side when image data is generated.

In contrast, unlike the CRT devices, the display characteristic of the projection apparatuses using micro-mirror devices as described above is linear. Accordingly, it is necessary to perform a reverse correction on broadcasted image signals in order to cancel the γ correction performed on the transmission side.

An example of the γ correction performed on the reception side is one in which a prescribed mathematical operation is performed on the input data itself. However, this mathematical operation for the γ correction is complicated because its use of a logarithm function. Also, a larger scale operation circuit is required, which to increases the production costs of projection apparatuses.

It is also possible to adapt a conversion technology using a lookup table or the like, thereby avoiding such mathematical operations. However, in order to attain an acceptable accuracy of operation (i.e., conversion accuracy), the gray scale accuracy of the input data has to be increased (in other words, the number of bits has to be increased) before conversion, which forces the lookup table or the like to occupy a greater volume of memory, which increases the production costs of projection apparatuses.

SUMMARY OF THE INVENTION

It is an aspect of the present invention to provide an improved image display apparatus implemented with a new technology to achieve adjustable and high performance display images with higher resolution of gray scales. The improved apparatuses and control methods are not limited by the display gray scale performance of the conventional spatial light modulator such that the above-discussed difficulties and limitations are resolved.

It is another aspect of the present invention to provide an improved image display apparatus implemented with a spatial light modulator with a higher resolution of gray scales to permit a gamma correction in a projection apparatus without making complicated configuration modifications or increasing the production costs of the image display apparatuses.

A first exemplary embodiment of the present invention provides a projection apparatus, comprising a light source, a light source control unit for controlling output of the light source, at least one spatial light modulator for modulating illumination light from the light source by a plurality of pixel elements, and an optical system for projecting, to a screen, the illumination light deflected by the spatial light modulator, wherein the light source control unit performs a gamma (γ) correction on input image data by a modulation control of the light source.

A second exemplary embodiment of the present invention provides the projection apparatus according to the first exemplary embodiment, wherein the light source control unit modulates the illumination light by making an intensity of the illumination light variable.

A third exemplary embodiment of the present invention provides the projection apparatus according to the first exemplary embodiment, wherein the light source control unit modulates the illumination light by making an emission pulse interval of pulse emission of the light source variable.

A fourth exemplary embodiment of the present invention provides the projection apparatus according to the first exemplary embodiment, wherein the light source control unit modulates the illumination light by making an emission pulse interval of pulse emission of the light source constant and by making emission pulse width variable.

A fifth exemplary embodiment of the present invention provides the projection apparatus according to the first exemplary embodiment, wherein the light source control unit modulates the illumination light by making an emission pulse interval and emission pulse width of pulse emission of the light source variable.

A sixth exemplary embodiment of the present invention provides the projection apparatus according to the first exemplary embodiment, wherein the light source control unit modulates the illumination light by making at least one of an emission pulse interval, emission pulse width, and an emission pulse intensity of pulse emission of the light source variable.

A seventh exemplary embodiment of the present invention provides the projection apparatus according to the first exemplary embodiment, wherein the gamma correction is individually performed for each color of the illumination light.

An eighth exemplary embodiment of the present invention provides the projection apparatus according to the first exemplary embodiment, wherein the spatial light modulator comprises a micromirror device in which a plurality of mirror elements for deflecting light from the light source are arranged.

A ninth exemplary embodiment of the present invention provides the projection apparatus according to the first exemplary embodiment, wherein the light source is a light emitting diode (LED) or a laser device.

A tenth exemplary embodiment of the present invention provides a projection apparatus, comprising a light source, a light source control unit for controlling output of the light source, a gamma corrector for performing a gamma correction on input image data, at least one spatial light modulator for modulating illumination light from the light source by a plurality of pixel elements; and an optical system for projecting, to a screen, the illumination light deflected by the spatial light modulator, wherein the light source control unit further performs a gamma ($\gamma$) correction by a modulation control of the light source after the gamma corrector performs a gamma correction.

An eleventh exemplary embodiment of the present invention provides the projection apparatus according to the tenth exemplary embodiment, wherein the light source control unit modulates the illumination light by making an intensity of the illumination light variable.

A twelfth exemplary embodiment of the present invention provides the projection apparatus according to the tenth exemplary embodiment, wherein the light source control unit modulates the illumination light by making an emission pulse interval of pulse emission of the light source variable.

A thirteenth exemplary embodiment of the present invention provides the projection apparatus according to the tenth exemplary embodiment, wherein the light source control unit modulates the illumination light by making an emission pulse interval of pulse emission of the light source constant and by making emission pulse width variable.

A fourteenth exemplary embodiment of the present invention provides the projection apparatus according to the tenth exemplary embodiment, wherein the light source control unit modulates the illumination light by making an emission pulse interval and emission pulse width of pulse emission of the light source variable.

A fifteenth exemplary embodiment of the present invention provides the projection apparatus according to the tenth exemplary embodiment, wherein the light source control unit modulates the illumination light by making at least one of an emission interval, emission pulse width, and an emission pulse intensity of pulse emission of the light source variable.

A sixteenth exemplary embodiment of the present invention provides the projection apparatus according to the tenth exemplary embodiment, wherein the gamma correction is individually performed for each color of the illumination light.

A seventeenth exemplary embodiment of the present invention provides the projection apparatus according to the tenth exemplary embodiment, wherein the spatial light modulator comprises a micromirror device in which a plurality of mirror elements for deflecting light from the light source are arranged.

An eighteenth exemplary embodiment of the present invention provides the projection apparatus according to the tenth exemplary embodiment, wherein the light source is a light emitting diode (LED) or a laser device.

A nineteenth exemplary embodiment of the present invention provides the projection apparatus, comprising a light source, a light source control unit for controlling output of the light source, at least one spatial light modulator for modulating illumination light from the light source by a plurality of pixel elements, an image analyzer for analyzing input image data; and an optical system for projecting, to a screen, the illumination light deflected by the spatial light modulator, wherein the light source control unit performs a gamma ($\gamma$) correction on input image data by performing a modulation control of the light source on the basis of output of the image analyzer.

A twentieth exemplary embodiment of the present invention provides the projection apparatus according to the nineteenth exemplary embodiment, wherein the light source control unit modulates the illumination light by making an intensity of the illumination light variable.

A twentieth-first exemplary embodiment of the present invention provides the projection apparatus according to the nineteenth exemplary embodiment, wherein the light source control unit modulates the illumination light by making an emission pulse interval of pulse emission of the light source variable.

A twentieth-second exemplary embodiment of the present invention provides the projection apparatus according to the nineteenth exemplary embodiment, wherein the light source control unit modulates the illumination light by making an emission pulse interval of pulse emission of the light source constant and by making emission pulse width variable.

A twentieth-third exemplary embodiment of the present invention provides the projection apparatus according to the nineteenth exemplary embodiment, wherein the light source control unit modulates the illumination light by making an emission pulse interval and emission pulse width of pulse emission of the light source variable.

A twentieth-fourth exemplary embodiment of the present invention provides the projection apparatus according to the nineteenth exemplary embodiment, wherein the light source control unit modulates the illumination light by making at least one of an emission pulse interval, emission pulse width, and an emission pulse intensity of pulse emission of the light source variable.

A twentieth-fifth exemplary embodiment of the present invention provides the projection apparatus according to the nineteenth exemplary embodiment, wherein the gamma correction is individually performed for each color of the illumination light.

A twentieth-sixth exemplary embodiment of the present invention provides the projection apparatus according to the nineteenth exemplary embodiment, wherein the spatial light modulator comprises a micromirror device in which a plurality of mirror elements for deflecting light from the light source are arranged.

A twentieth-seventh exemplary embodiment of the present invention provides the projection apparatus according to the nineteenth exemplary embodiment, wherein the light source is a light emitting diode (LED) or a laser device.

BRIEF DESCRIPTION OF THE DRAWINGS

The present invention is described in detail below with reference to the following figures.

FIG. 1A is a functional block diagram for showing the configuration of a projection apparatus according to conventional technology;

FIG. 1B is a functional block diagram for showing the configuration of the mirror element of a projection apparatus according to conventional technology;

FIG. 5A is a side view diagram showing an example of a deflection state when the mirror is ON;

DESCRIPTION OF THE PREFERRED EMBODIMENTS

Hereinafter, preferred embodiments of the present invention will be explained by referring to the <<Disclosure Contents>> provided below.

<<Disclosure Content 1>>

Preferred Embodiment 1-1

The preferred embodiment 1-1 of the present invention relates to a mirror device that arranges deflectable mirrors and to a method for regulating the deflection angle of a mirror.

Figure 1C:
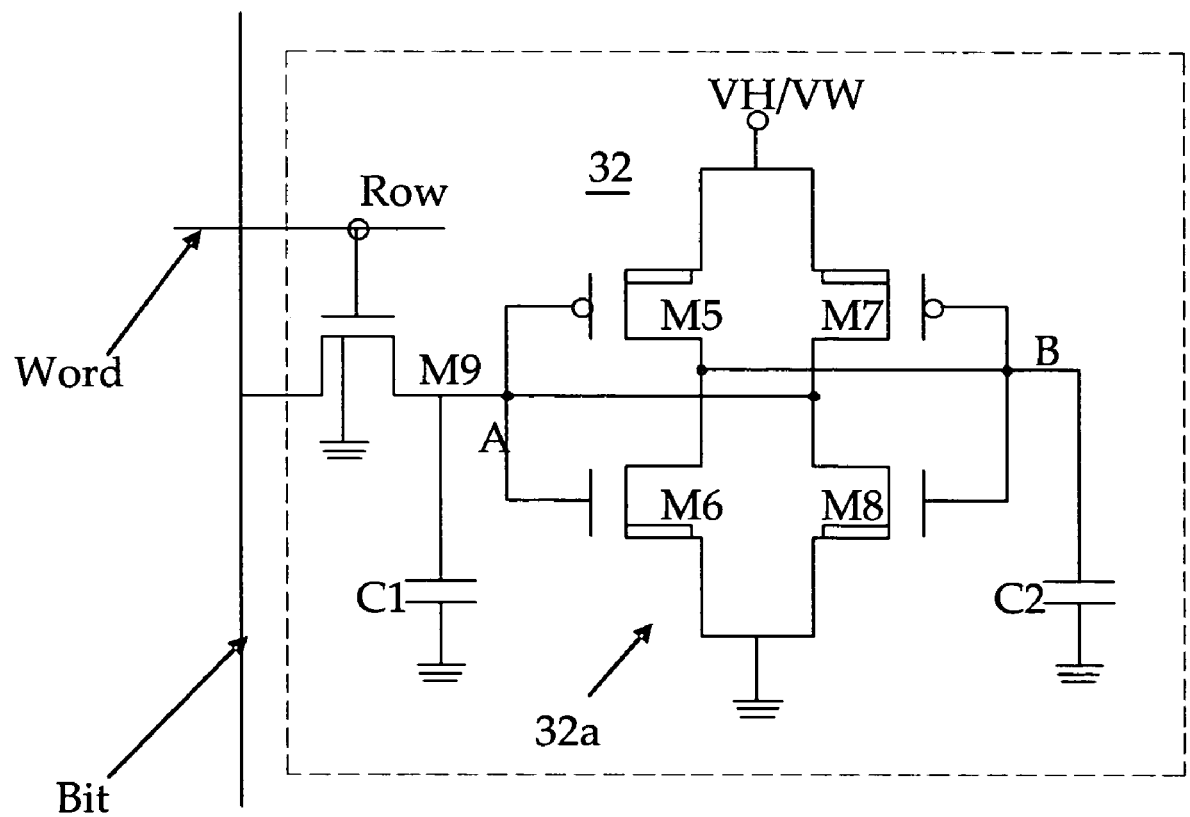
FIG. 1C is a functional block diagram for showing the configuration of the drive circuit of a mirror element of a projection apparatus according to conventional technology.
Figure 1D:
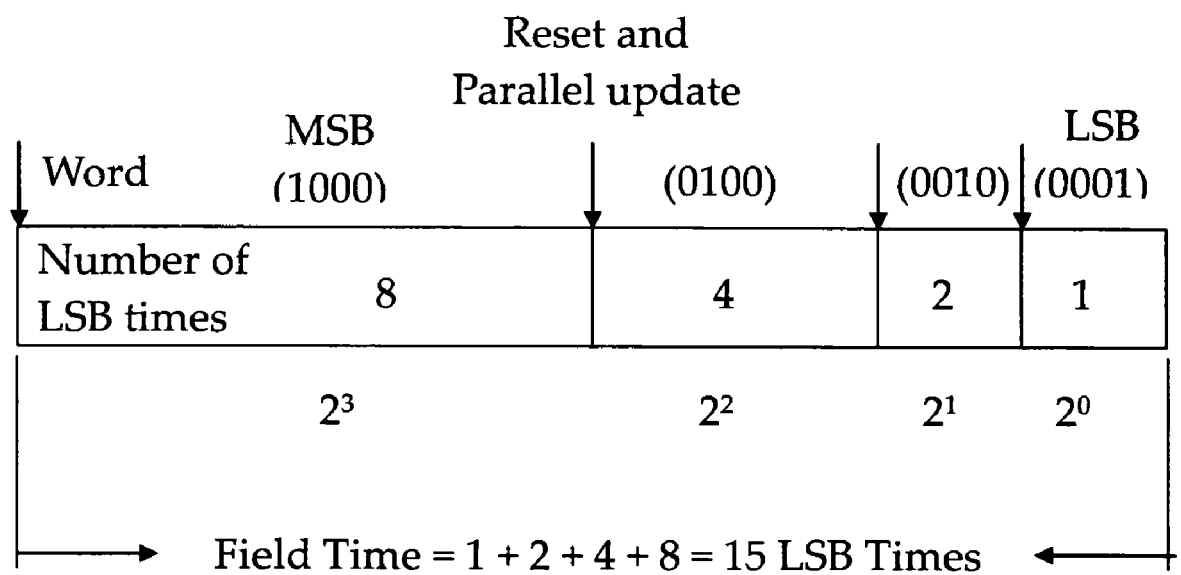
FIG. 1D is a functional block diagram for showing the format of image data used in the projection apparatus according to conventional technology.
Figure 1E:
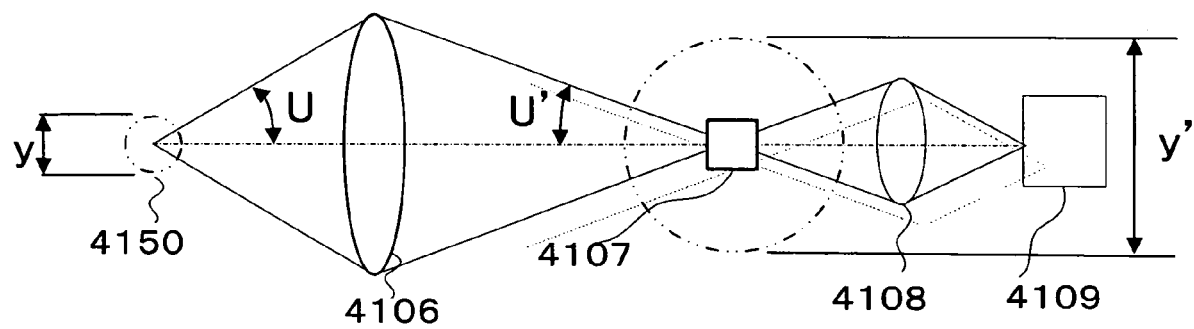
FIG. 1E is a side cross sectional view for illustrating the etendue by exemplifying the case of using a discharge lamp light source and projecting an image by way of an optical device.

FIG. 1E cross sectional view for showing the etendue of a light projecting system using a discharge lamp as the light source to project an image through an image by way of an optical device.

Outline of the Device

The first is a description of a mirror device.

Image projection apparatuses implemented with a spatial light modulator (SLM), such as a transmissive liquid crystal, a reflective liquid crystal, a mirror array and other similar image modulation devices, are widely known.

A spatial light modulator is formed as a two-dimensional array of optical elements, ranging from tens of thousands to millions of miniature modulation elements, with individual elements enlarged and displayed as the individual pixels corresponding to an image to be displayed onto a screen by way of a projection lens.

The spatial light modulators generally used for projection apparatuses primarily include two types, i.e., a liquid crystal device for modulating the polarizing direction of incident light by sealing a liquid crystal between transparent substrates and providing them with a potential, and a mirror device deflecting miniature micro electro mechanical systems (MEMS) mirrors with electrostatic force and controlling the reflecting direction of illumination light.

One embodiment of the above described mirror device is disclosed in U.S. Pat. No. 4,229,732, in which a drive circuit using MOSFET and deflectable metallic mirrors are formed on a semiconductor wafer substrate. The mirror deflects to different angles according to the electrostatic force supplied from the drive circuit and is capable of changing the reflecting direction of the incident light.

Meanwhile, U.S. Pat. No. 4,662,746 has disclosed an embodiment in which one or two elastic hinges retain a mirror. If the mirror is retained by one elastic hinge, the elastic hinge functions as bending spring. If the mirror is retained by two elastic hinges, they function as torsion springs to incline the mirror, thereby the deflecting the reflecting direction of incident light.

As described above, the ON-and-OFF states of a micromirror control scheme as that implemented in U.S. Pat. No. 5,214,420 and by most conventional display systems limits display quality. Specifically, conventional control circuits limits the gray scale (PWM between ON and OFF states) since it is limited by the LSB (least significant bit, or the least pulse width). Due to the ON-OFF states implemented in conventional systems, there is no way to provide a shorter pulse width than the LSB. The lowest brightness, which determines the gray scale, is the light reflected during the least pulse width. The limited gray scale leads lower image quality.

Specifically, FIG. 1C exemplifies a conventional control circuit for a micromirror according to U.S. Pat. No. 5,285,407. The control circuit includes memory cell 32. Various transistors are referred to as "M*" where * designates a transistor number and each transistor is an insulated gate field effect transistor. Transistors M5 and M7 are p-channel transistors; transistors, M6, M8, and M9 are n-channel transistors. The capacitances, C1 and C2, represent the capacitive loads of the memory cell 32. Memory cell 32 includes an access switch transistor M9 and a latch 32a, which is the basis of the static random access switch memory (SRAM) design. All access transistors M9 in a row receive a DATA signal from a different bit-line 31a. The particular memory cell 32 is accessed and written by turning on the appropriate row select transistor M9, using the ROW signal functioning as a word-line. Latch 32a is formed from two cross-coupled inverters, M5/M6 and M7/M8, which permit two stable states. State 1 is Node A high and Node B low and state 2 is Node A low and Node B high.

The mirror driven by a drive electrode abuts a landing electrode structured differently from the drive electrode, thereby a prescribed tilt angle is maintained. A "landing chip", which possesses a spring property, is formed on the point of contact between the landing electrode and the mirror. This configuration enhances the deflection of the mirror to the reverse direction upon a change in the control. The parts forming the landing chip and the landing electrode are maintained at the same potential so that contact will not cause a shorting or other similar disruption.

Outline of PWM Control

The following description explains the pulse-width modulation (PWM) control.

As described above and shown in FIG. 1A, an operation for switching the mirror by the control circuit deflects the micromirrors in either an ON or an OFF angular orientation. The brightness, i.e., the gray scales of display for a digitally controlled image system is determined by the length of time the micromirror stays at an ON position. The length of time a micromirror is controlled at an ON position is controlled by a multiple bit word. FIG. 1D shows the "binary time intervals" when the micromirror is controlled by a four-bit word. As in FIG. 1D, the time durations have relative values of 1, 2, 4, 8 that, in turn, define the relative brightness for each of the four bits where 1 is the least significant bit and 8 is the most significant bit. According to the control mechanism as shown, the minimum controllable differences between gray scales for showing different brightness is the brightness represented by the "least significant bit" that can maintain the micromirror at an ON position.

In a simple exemplary display system operated with an n bits brightness control signal for controlling the gray scales, the frame time is divided into $2^n-1$ equal time slices. For a 16.7 milliseconds frame period and n-bit intensity values, the time slice is $16.7/(2^n-1)$ milliseconds.

Having established these time slices for controlling the length of time for displaying each pixel in each frame, the pixel intensities are determined by the number of time slices represented by each bit. Specifically, a display of a black pixel is represented by 0 time slices. The intensity level represented by the LSB is 1 time slice, and maximum brightness is $2^n-1$ time slices. The number time slices that a micro mirror is controlled to operate at an On-state in a frame period determines a specifically quantified light intensity of each pixel corresponding to the micromirror reflecting a modulated light to that pixel. Thus, during a frame period, each pixel corresponding to a modulated micromirror controlled by a control word with a quantified value of more than 0 is operated at an on state for the number of time slices that correspond to the quantified value represented by the control word. The viewer's eye integrates the pixels' brightness so that the image appears the same as if it were generated with analog levels of light.

For addressing deformable mirror devices, a pulse width modulator (PWM) receives the data formatted into "bit-planes". Each bit-plane corresponds to a bit weight of the intensity value. Thus, if each pixel's intensity is represented by an n- bit value, each frame of data has n bit-planes. Each bit-plane has a 0 or 1 value for each display element. In the example described in the preceding paragraphs, each bit-plane is separately loaded during a frame. The display elements are addressed according to their associated bit-plane values. For example, the bit-plane representing the LSBs of each pixel is displayed for 1 time slice.

Outlines of Mirror Size and Resolution

The following description explains the size of a mirror and the resolution.

The size of a mirror for constituting such a mirror device is between 4 μm and 20 μm on each side. The mirrors are placed on a semiconductor wafer substrate in such a manner as to minimize the gap between adjacent mirrors. Smaller gaps reduce random and interfering reflection lights from the gap to prevent such reflections from degrading the contrast of the displayed images. The mirror device is formed a substrate that includes an appropriate number of mirror elements. Each mirror element is applied to modulate a corresponding image display element known as a pixel. The appropriate number of image display elements is determined according to image display standards in compliance to the resolution of a display specified by the Video Electronics Standards Association (VESA) and to the television-broadcasting standard. For example, in the case of configuring a mirror device in compliance with the WXGA (with the resolution of 1280×768) as specified by VESA and in which the size of each mirror is 10 μm, the diagonal length of the display area will be about 0.61 inches, thus producing a sufficiently small mirror device.

Outline of Projection Apparatus

The following a description is for a projection apparatus.

The projection apparatuses using deflection-type ("deflectable") light modulators are primarily categorized into two types, i.e., a single-panel projection apparatus comprising a single spatial light modulator, which spatially changes the frequency of a projection light and displays an image in colors, and a multi-panel projection apparatus comprising spatial light modulators, which constantly modulate the illumination light with different frequencies by means of individual spatial light modulators and displays an image in colors by synthesizing these modulated lights.

The single-panel projection apparatus is configured as FIG. 1A described above.

Outline of the Introduction of Laser Light Source

The following a description is for a laser light source.

Figure 2:
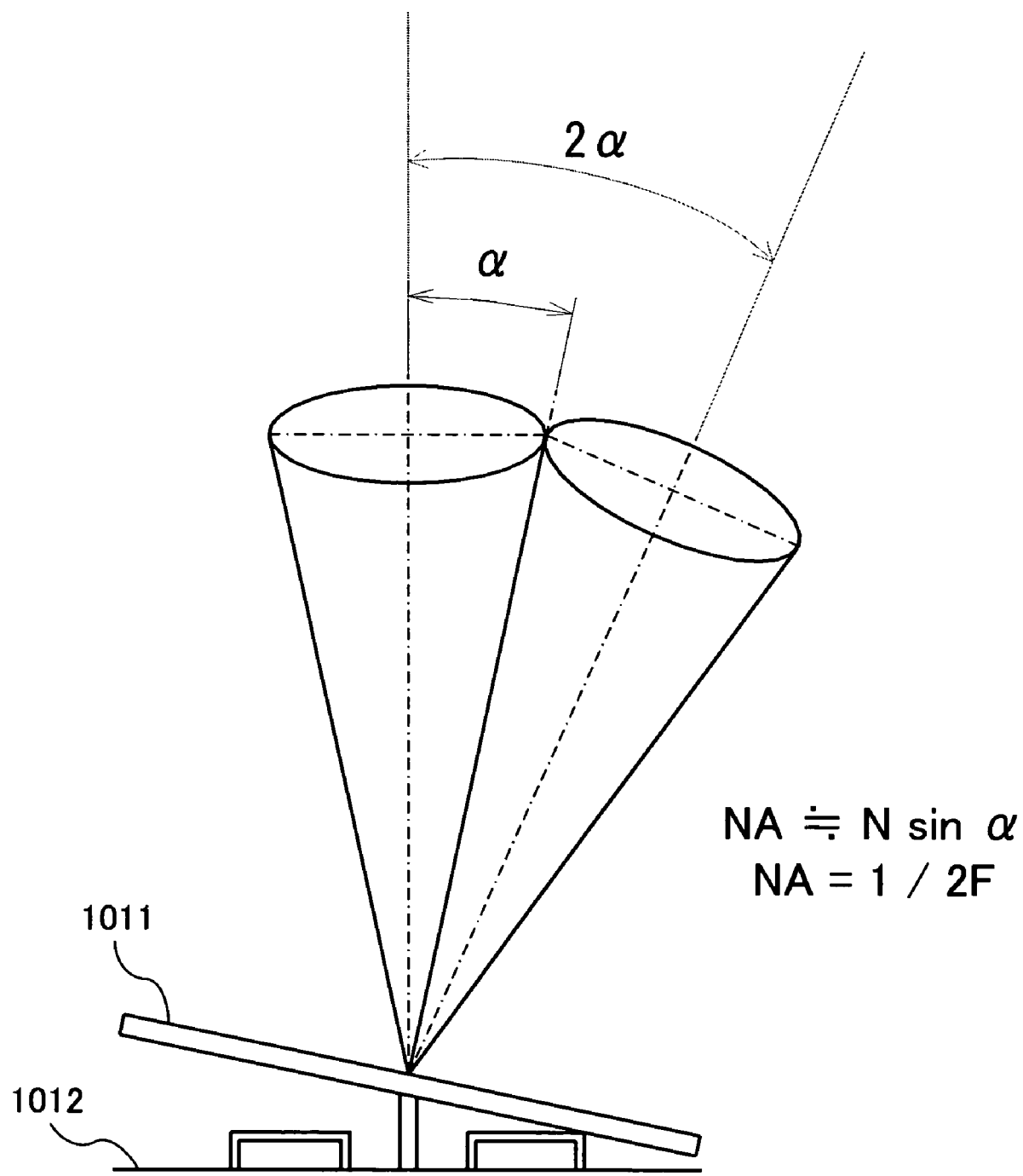
FIG. 2 is a diagram showing the relationship between the numerical aperture NA1 of an illumination light path, the numerical aperture NA2 of a projection light path and the tilt angle α of a mirror.

In the projection apparatus that includes a reflective spatial light modulator implemented with a mirror described above, there is a close relationship between the numerical aperture (NA) NA1 of an illumination light path, the numerical aperture NA2 of a projection light path, and the tilt angle α of a mirror. FIG. 2 shows the relationship between them.

Assuming that the tilt angle α of a mirror 1011 is 12 degrees. When a modulated light reflected by mirror 1011 and incident to the center of the projection light path is set perpendicular to a device substrate 1012, the illumination light is incident from a direction inclined by 2α, that is, 24 degrees, relative to the perpendicular of the device substrate 1012. For the light beam reflected by the mirror to be most efficiently incident to the center of the projection lens, the numerical aperture of the projection light path should be equal to the numerical aperture of the illumination light path. If the numerical aperture of the projection light path is smaller than that of the illumination light path, the illumination light cannot be sufficiently projected into the projection light path; however, if the numerical aperture of the projection light path is larger that that of the illumination light path, the illumination light can be entirely directed; the projection lens then becomes unnecessarily large. Further in this event, the light fluxes of the illumination light and projection light need to be placed apart from each other because the optical members of the illumination system and those of the projection system need to be physically separated. Keeping the above considerations in mind, when a spatial light modulator with the tilt angle of a mirror being 12 degrees is used, the numerical aperture (NA) NA1 of the illumination light path and the numerical aperture NA2 of the projection light path are preferably set as follows:

$$NA1=NA2=\sin \alpha=\sin 12°.$$

If the F-number of the illumination light path is F1 and the F-number of the projection light path is F2, then the numerical aperture can be converted into an F-number as follows:

$$F1=F2=1/(2*NA)=1/(2*\sin 12°)=2.4.$$

In order to maximize the use of illumination light emitted from a non-coherent light source, such as a high-pressure mercury lamp or a xenon lamp, which is generally used for projection apparatuses, the projection angle of light must be maximized on the illumination light path side. Since the numerical aperture of the illumination light path is determined by the tilt angle of a mirror to be used, it is clear that the tilt angle of the mirror needs to be large in order to increase the numerical aperture of the illumination light path.

However, increasing of the tilt angle of the mirror requires a higher drive voltage for driving the mirror.

Because a greater tilt angle of the mirror requires physical space to allow for the tilting of the mirror, a greater distance must exist between the mirror and the electrode driving the mirror. The electrostatic force F generated between the mirror and the electrode is given by the following equation:

$$F=(\epsilon*S*V^2)/(2*d^2),$$

where "S" is the area size of the electrode, "V" is a voltage, "d" is the distance between the electrode and mirror, and "ε" is the permittivity of vacuum.

The equation shows that the drive force decreases in proportion to the second power of the distance d between the electrode and the mirror. It is possible to increase the drive voltage to compensate for the decrease in the drive force associated with the increase in the distance; conventionally, however, the drive voltage is about 3 to 15 volts in the drive circuit by means of a CMOS process used for driving a mirror and, therefore, a relatively special process such as a DMOS process is required if a drive voltage in excess of about 15 volts is needed. That is not preferable cost reduction remains a consideration.

Further, in order to reduce the cost of a mirror device, it is desirable to obtain as many mirror devices as possible from a single semiconductor wafer substrate for the improvement of productivity. That is, a decrease in the size of mirror elements reduces the size of the mirror device per se. It is clear that the area size of an electrode is reduced in association with a decrease in the size of the mirror, which also requires less driving power in accordance with the above equation.

In contrast to the need to decrease the size of a mirror device, the larger a mirror device, the brighter it can illuminate as long as a conventional lamp is used. This is because a conventional lamp with a non-directivity in its emission allows the usage efficiency of light to be substantially reduced. This is attributable to a relationship commonly called etendue.

As shown in FIG. 1E above, where "y" is the size of a light source 4150, "u" is the importing angle of light on the light source side of the illumination lens 4106, "y'" is the size of the image of a light source, and "u'" is the converging angle on the image side (device 4107), the relationship between these, when the projected image is to be projected via the device 4107 and the projection lens, is represented by the following equation:

$$y*u=y'*u'.$$

That is, the smaller the device onto which a light source will project an image, the smaller the importing angle on the light source side becomes. This is why it is advantageous to use a laser light source, which possesses strong directivity of emission light, in order to decrease the size of the mirror device.

Outline of Resolution Limit

The following description is to explain a resolution limit.

The following discussions are based on an examination of the limit value of the aperture ratio of a projection lens used for a projection apparatus. The projection lens displays the image on a display surface by enlarging the image modulated with specific resolution and reflected from a spatial light modulator. The resolution of projected image can be further understood according to the following descriptions.

A symbol "Rp" denotes the pixel size of the spatial light modulator, "NA" represents the aperture ratio of a projection lens, "F" is an F number and "λ" is the wavelength of light, the limitative "Rp" with which any adjacent pixels on the projection surface are separately observed is derived by the following equation:

$$Rp=0.61*\lambda/NA=1.22*\lambda*F.$$

The table below shows the F value of a projection lens and the deflection angle of a mirror by shrinking the mirror size that further shortens the distance between the adjacent mirror elements. The wavelength of light beam is designated at a value of λ=650 nm representing a lowest value within the range of visible light. Meanwhile, the F value of a projection lens with the wavelength designated at 700 nm is about 7% smaller than the F value for the wavelength of 650 nm.

| Pixel size of mirror device [μm] | F number of projection lens | Deflection angle of mirror [degrees] |
| --- | --- | --- |
| 4 | 5.04 | 5.69 |
| 5 | 6.30 | 4.55 |
| 6 | 7.56 | 3.79 |
| 7 | 8.82 | 3.24 |
| 8 | 10.08 | 2.84 |
| 9 | 11.34 | 2.52 |
| 10 | 12.61 | 2.27 |
| 11 | 13.87 | 2.06 |

Therefore, since the difficulties related to the above described concerns with etendue is circumvented by using a laser light for the light source, the F numbers of lenses for the illumination system and projection system can be increased to the values shown in the table. Therefore, it is achievable to decrease the deflection angle of the mirror element, and thereby, a smaller mirror device with a low drive voltage can be configured.

Outline of Oscillation Control

The following a description explains the oscillation control process.

Other than the method of minimizing the tilt angle of the mirror, US Patent Application 20050190429 discloses another method for reducing a drive voltage. A mirror is held in a free oscillation state in the inherent oscillation frequency, and thereby, the intensity of light that is about 25% to 37% of the emission light intensity when a mirror is controlled under a constant ON state can be obtained during the oscillation period of the mirror.

By controlling and operating the mirror with intermediate oscillation state, it is no longer required to drive the mirror in high speed. Furthermore, the intermediate oscillation states enable the projection of images with higher levels of gray scale. The mirror also has hinges that have a low spring constant as a spring member for supporting the mirror, and therefore enabling a reduction in the drive voltage. Furthermore, combining this technique with the method of decreasing the drive voltage by decreasing the deflection angle of the mirror, as described above, will increase the level of gray scale to a greater degree. As described above, the use of a laser light source makes it possible to decrease the deflection angle of a mirror and also shrink the mirror device without decreasing the display brightness. Additionally, by implementing the above-described oscillation control method enables a higher level of gray scale without causing an increase in the drive voltage. However, if an electrode for driving a mirror and a stopper for determining the deflection angle of the mirror are individually configured, as in the conventional method, the problem of inefficient space usage remains.

U.S. Pat. No. 5,583,688, US Patent 20060152690, U.S. Pat. Nos. 6,198,180, and 6,992,810 disclose configurations for determining the deflection angle of a mirror in a conventional mirror device. The above-disclosed configurations however have difficulties for a person of ordinary skill in the art to increase the size of address electrodes. In consideration of the problems noted above, the preferred embodiment 1-1 of the present invention is accordingly configured to integrate the electrode used for driving a mirror element with a stopper used for determining the deflection angle of a mirror.

The following is a description, in detail, of a mirror device according to the present embodiment.

Figure 3A:
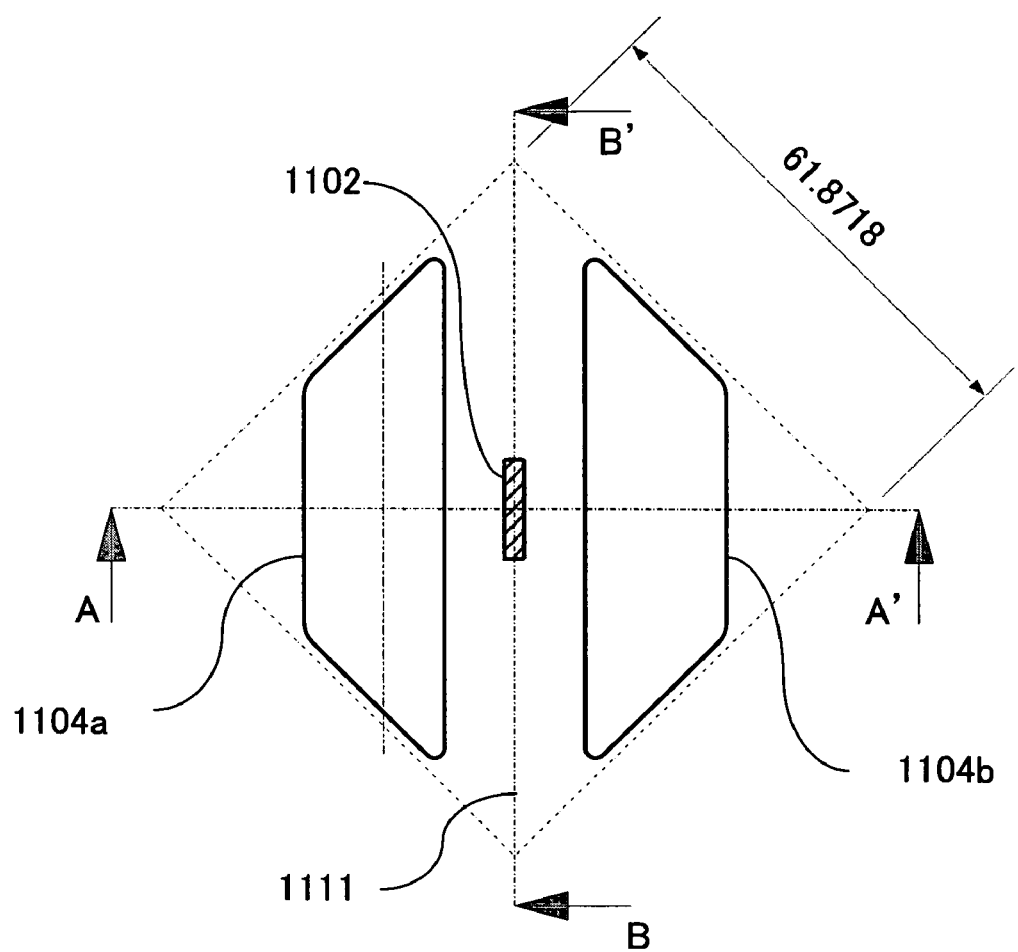
FIG. 3A is a cross-sectional view illustrating an example of a mirror device according to the preferred embodiment 1-1.
Figure 3B:
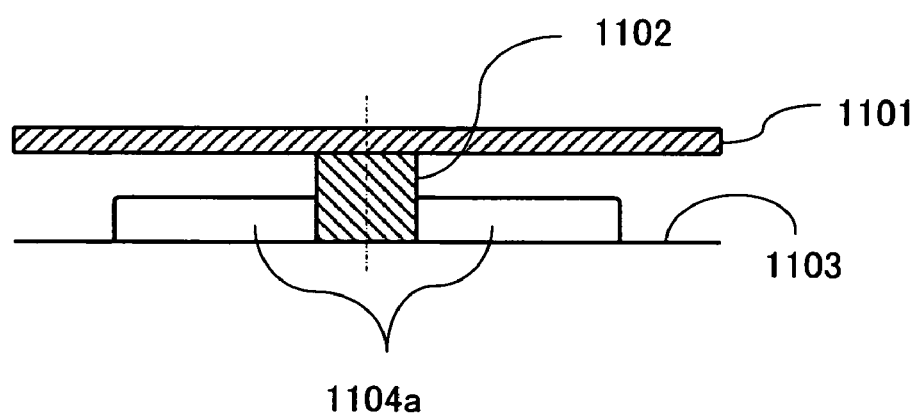
FIG. 3B is a cross-sectional view of a part along line B-B' in an example of a mirror element in the mirror device shown in FIG. 3A according to the preferred embodiment 1-1.
Figure 3C:
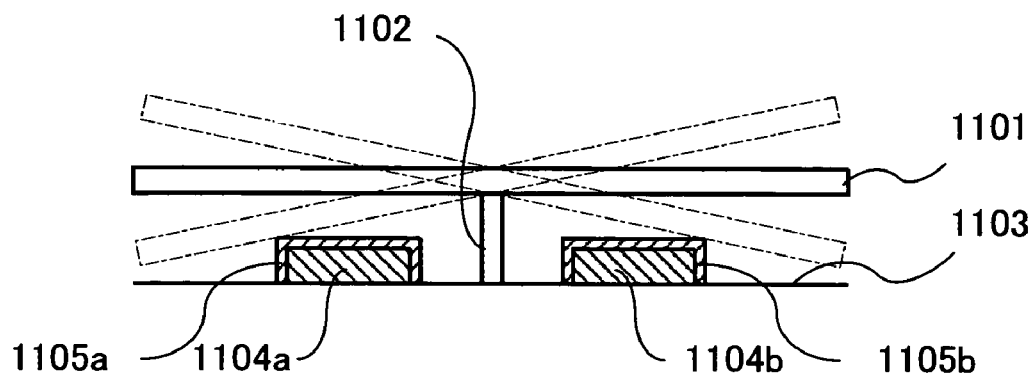
FIG. 3C is a cross-sectional view of a part along line A-A' in an example of the mirror element in the mirror device shown in FIG. 3A according to the preferred embodiment 1-1.

FIG. 3A is a top view of a mirror for illustrating the configuration of the mirror element of a mirror device according to the preferred embodiment 1-1. FIG. 3B is a side cross-sectional view for illustrating the configuration of the mirror element of a mirror device according to the preferred embodiment 1-1. FIG. 3C is another side cross-sectional view for illustrating the configuration of the mirror element of a mirror device according to the preferred embodiment of 1-1.

FIGS. 3A to 3C show a mirror element that includes a mirror 1101 having a highly reflective top surface coated with material, such as aluminum or gold. The mirror 1101 is supported by an elastic hinge 1102 made of a silicon material, a metallic material and the like, and is placed on a substrate 1103. The silicon material may include poly-silicon, single crystal silicon and amorphous silicon, while the metallic material may include aluminum, titanium, and an alloy of some of these metallic materials, or a composite of these metals or alloys. The mirror 1101 is in the approximate shape of a square, with the length of one side, for example, between 4 μm and 11 μm. The size of adjacent mirrors is also between, for example, 4 μm and 11 μm. The deflection axis 1111 of the mirror 1101 is on the diagonal line. The lower end of the elastic hinge 1102 is connected to the substrate member 1103 that includes a circuit for driving the mirror 1101. The upper end of the elastic hinge 1102 is connected to the bottom surface of the mirror 1101. An electrode for reliably maintain electrical connectivity and an intermediate member for strengthening the support structures and strengthening the connection may be placed between the elastic hinge 1102 and substrate 103, or between the elastic hinge 1102 and mirror 1101.

In FIGS. 3A through 3C, electrodes 1104 (i.e., 1104a and 1104b) used for driving the mirror 1101 are placed on the top surface of the substrate 1103 opposite to the bottom surface of the mirror 1101. The form of the electrode 1104 may be symmetrical or asymmetrical about the deflection axis 1111. The electrode 1104 is made of aluminum or tungsten. The present embodiment is configured such that the electrode 1104 also carries out the function of a stopper for contacting and stopping the mirror from further movement when the mirror is deflected to a maximum deflection angle. The deflection angle of the mirror is the angle determined by the aperture ratio of a projection lens that satisfies a theoretical resolution determined by the size of adjacent mirrors on the basis of the equation described below:

$$Rp = 0.61 * \lambda/NA = 1.22 * \lambda * F.$$

Alternatively, larger deflection angle may be implemented. For example, the deflection angle of the mirror 1101 may be controlled to operate between 10 degrees and 14 degrees relative to the horizontal state of the mirror 1101 or between 2 degrees and 10 degrees relative to the horizontal state of the mirror 1101. Configuring the electrode 1104 to also function as stopper makes it possible to maximize the electrode layout space when shrinking the mirror element, as compared to the conventional method of placing the electrode and stopper individually.

The electrode may be formed, as shown in FIGS. 3A through 3C, as a trapezoid with the top and bottom sides approximately parallel to the deflection axis 1111, and the sloped sides approximately parallel to the contour line of the mirror 1101 of the mirror device. The deflection axis of the mirror 1101 is matched with the diagonal line of the electrode. The electrode and stopper can usually be simultaneously manufactured as in the conventional method, and therefore such the electrode and stopper may be conveniently formed during the manufacturing processes.

A difference in potentials must be generated between the mirror and electrode to drive the mirror with electrostatic force. The present embodiment using the electrode also as a stopper provides the surface of the electrode or/and the rear surface of the mirror with an insulation layer(s) in order to prevent electrical shorting at the contact point between the mirror and the electrode. Furthermore, when the surface of the electrode has an insulation layer, the insulation layer can cover only the part that contacts the mirror. FIGS. 3A through 3C illustrate the surface of the electrode 1104 (i.e., 1104a and 1104b) with an insulation layer 1105 (i.e., 1105a and 1105b). The insulation layer is made of oxidized compound, azotized compound, and silicon or silicon compound, e.g., SiC, $SiO_2$, $Al_2O_3$, and Si. The material and thickness of the insulation layer is determined so that the dielectric strength voltage is maintained at no less than the voltage required to drive the mirror, most preferably no less than 5 volts. For example, the dielectric strength voltage may be two times the drive voltage of the mirror or higher, 3 volts or higher or 10 volts or higher.

Figure 4:
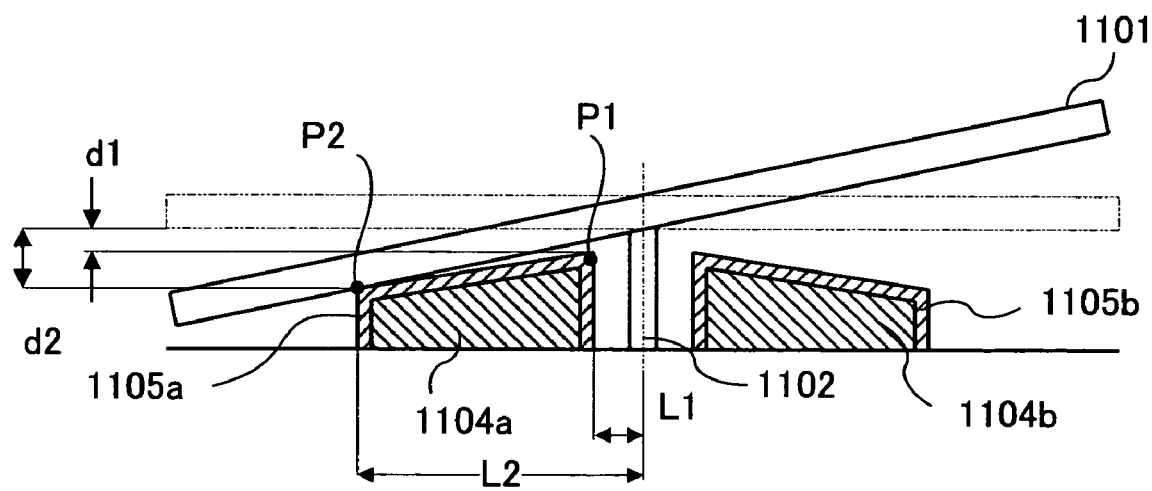
FIG. 4 shows another configuration of an electrode.

The following descriptions explain the size and shape of the electrode in one exemplary embodiment of this invention. Referring to FIG. 4 for a side cross sectional view of a mirror, where "L1" is the distance between the deflection axis and the edge of the electrode on the side closest to the deflection axis of the mirror 1101. The distance shown by "L2" is the distance between the deflection axis and the edge of the electrode on the side farthest from the deflection axis of the mirror 1101, and "d1" and "d2" are the distances between the mirror bottom surface and the top of the electrode at its respective edges. "P1" is a representative point at the electrode edge on the side closest to the deflection axis of the mirror and "P2" is a representative point at the electrode edge on the side farthest from the deflection axis of the mirror.

FIG. 4 shows an electrode formed so that d1<d2. In this configuration, the stopper determines the tilt angle of the mirror 1101 and should be placed at the point P2 in consideration of a production variance of the electrode height that influences the deflection angle of the mirror. The present embodiment is accordingly configured to satisfy the relationship of:

$$d1 > (L1 * d2)/L2.$$

This configuration significantly improves the efficient usage of the space under the mirror and maintains a stable deflection angle of the mirror.

In the case of configuring the electrode to provide distances d1 and d2 with d1=d2, the point P2 on the corner of the electrode determining the deflection angle of the mirror, and the configuration is determined to satisfy the following equation:

$$\cot\theta = d2/L2$$

The following is a description of the circuit comprisal of the mirror device according to the present embodiment.

Figure 11:
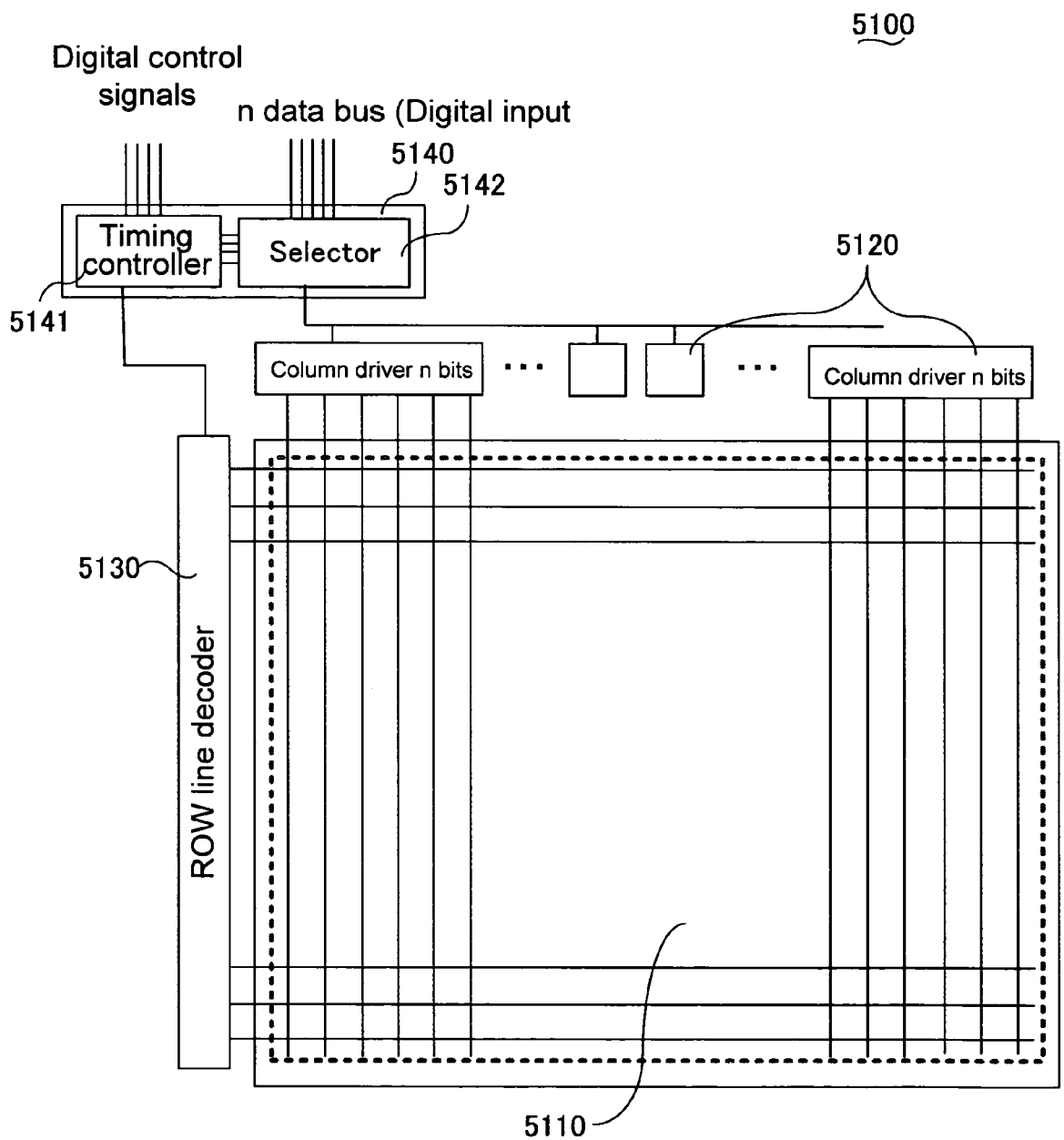
FIG. 11 is a functional block diagram for showing the layout of the internal configuration of a spatial light modulator according to the embodiment of the present invention.
Figure 13:
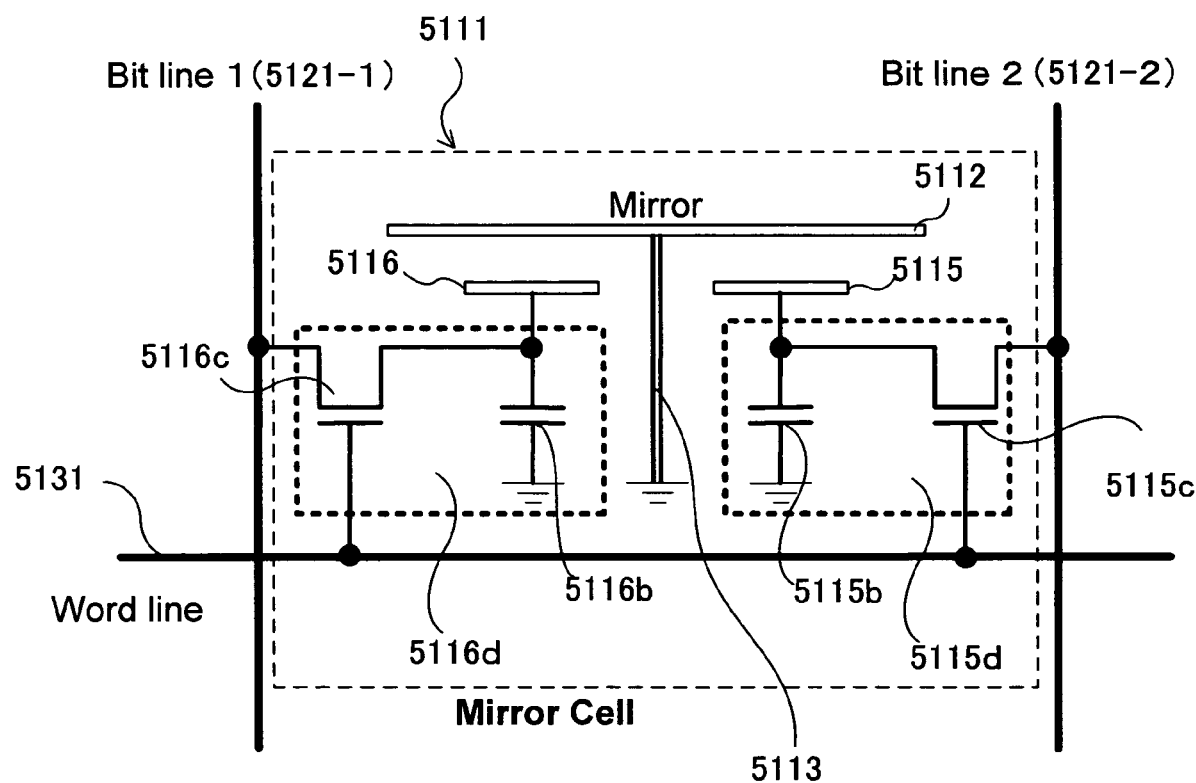
FIG. 13 is a functional block diagram for showing the configuration of an individual pixel unit constituting a spatial light modulator according to the embodiment of the present invention.

The circuit comprisal of the mirror device according to the present embodiment is illustrated in FIGS. 11 and 13, both of which are described later, and therefore their descriptions are not provided here.

Figure 5A:
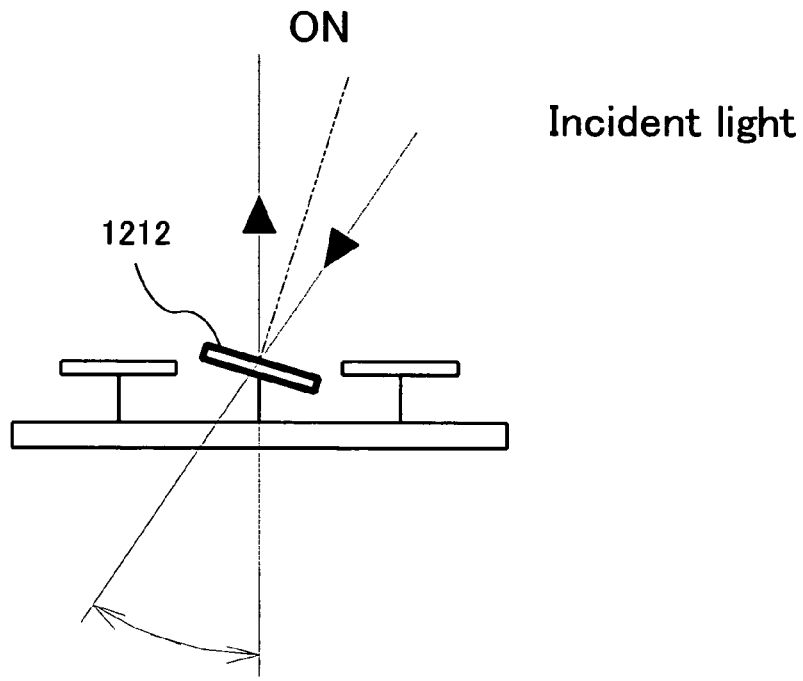
Figure 5C:
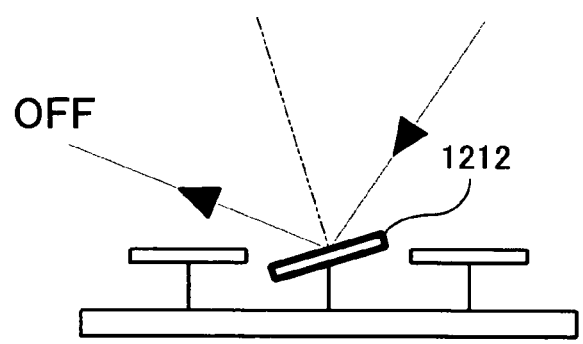
FIG. 5C is another side view diagram showing an example of the deflection state when the mirror is OFF.
Figure 5B:
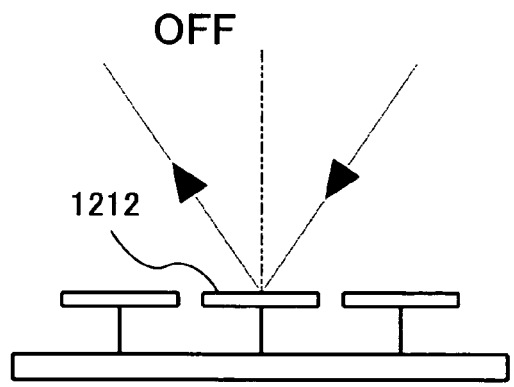
FIG. 5B is a side view diagram showing an example of a deflection state when the mirror is OFF.

Referring to FIGS. 5A to 5C for showing the light reflection from the mirrors. The mirror configuration and operation of mirror deflections present different deflection states when different voltages are applied to the electrodes. The light incident to the mirror 1212 is deflected in a specific direction as shown in FIGS. 5A through 5C. The following a description outlines the natural oscillation frequency of the oscillation system of a mirror device according to the present embodiment.

As discussed above, a reduced drive voltage when applied to a mirror with intermediate oscillation states can achieve a gray scale with higher resolution. With a least significant bit (LSB) defining a minimum controllable light intensity in a pulse width modulator (PWM) through mirror oscillation, the natural oscillation cycle of an oscillating mirror supported on an elastic hinge is further described below. The natural oscillation cycle T of an oscillation system can be determined as:

$$T = 2 * \pi * \sqrt{(I/K)} = LSB \text{ time}/X[\%];$$

where:
I is the rotation moment of an oscillation system,
K is the spring constant of an elastic hinge,
LSB time is the LSB cycle at displaying n bits, and
X [%] is the ratio of the light intensity obtained by one oscillation cycle to the full-ON light intensity of the same cycle.

Note that:

"I" is determined by the weight of the mirror and the distance between the center of gravity and the center of rotation;

"K" is determined by the thickness, width, length, and cross-sectional shape of an elastic hinge;

"LSB time" is determined from one frame time, or one frame time and the number of reproduction bits in the case of a single-panel projection method;

"X" is determined as in the above description, particularly from the F-number of a projection lens and the intensity distribution of an illumination light.

For example, when a single-panel color sequential method is employed, the ratio of emission intensity by one oscillation is assumed to be 32% and the minimum emission intensity in a 10-bit grayscale is achievable by an oscillation, then "I" and "K" are designed so as to have a natural oscillation cycle as follows:

$$T=1/(60*3*2^{10}*0.32)\approx 17.0 \; \mu sec.$$

In contrast, when a conventional PWM control is employed, the changeover transition time $t_M$ of a mirror is approximately equal to the natural oscillation frequency of the oscillation system of the mirror. Accordingly, the LSB is required to control the mirror that the light intensity in the interim during the changeover transition is negligible. The gray scale produced with the above-described hinge is about 8-bit, even if the LSB is set at five times the changeover transition time $t_M$. In other words, compared with a conventional display system, the display systems of this invention can achieve an image display with a 10-bit grayscale by using the 8-bit grayscale control signals because of the implementation of the intermediate control states.

In another exemplary embodiment for an image display system to display image with a 13-bit gray scale by a single-panel projection apparatus described above, the length of time represented by a LSB can be calculated as follows:

$$LSB \; time=(1/60)*(1/3)*(1/2^{13})=0.68 \; \mu sec.$$

For a display system with intermediate control state controllable to project 38% of the ON state intensity, the oscillation cycle T is as follows:

$$T=0.68/38\%=1.8 \; \mu sec.$$

In contrast, when attempting to obtain an 8-bit grayscale in a multi-panel projection apparatus described above, the length of time represented by the LSB can be calculated as follows:

$$LSB \; time=(1/60)*(1/3)*(1/2^{8})=21.7 \; \mu sec.$$

In another exemplary embodiment, when the light intensity obtained in one cycle by controlling the mirror to operate in an intermediate state is 20% of the ON state intensity, then the oscillation cycle T can be set as follows:

$$T=21.7/20\%=108.5 \; \mu sec.$$

As described above, the present embodiment is configured to set the mirror to oscillate with a natural oscillation cycle of the oscillation system. The display system includes an elastic hinge. The natural oscillation cycle can be set between about 1.8 μsec and 108.5 μsec with three deflection states. The mirror element in a first deflection state is modulated by the mirror element directed towards the projection light path. The mirror element in the second deflection state is controlled to reflect a light in a direction away from the projection light path. The mirror element in a third deflection state is controlled to oscillate between the first and second deflection states. The intermediate state provide a reduced amount of controllable light thus enabling the display system to display images of a gray scale with higher resolution without increasing the drive voltage of the mirror element. As described above, the present embodiment is configured to make the electrode also function as a stopper for regulating the maximum deflection angle of the mirror. By configuring the electrode to sever also as a stopper increases the efficiency of space usage while shrinking the mirror element and expanding the area of the electrode.

<<Disclosure Content 2>>

The following detail description is provided for an exemplary embodiment of the present invention by referring to the accompanying drawings.

Figure 6:
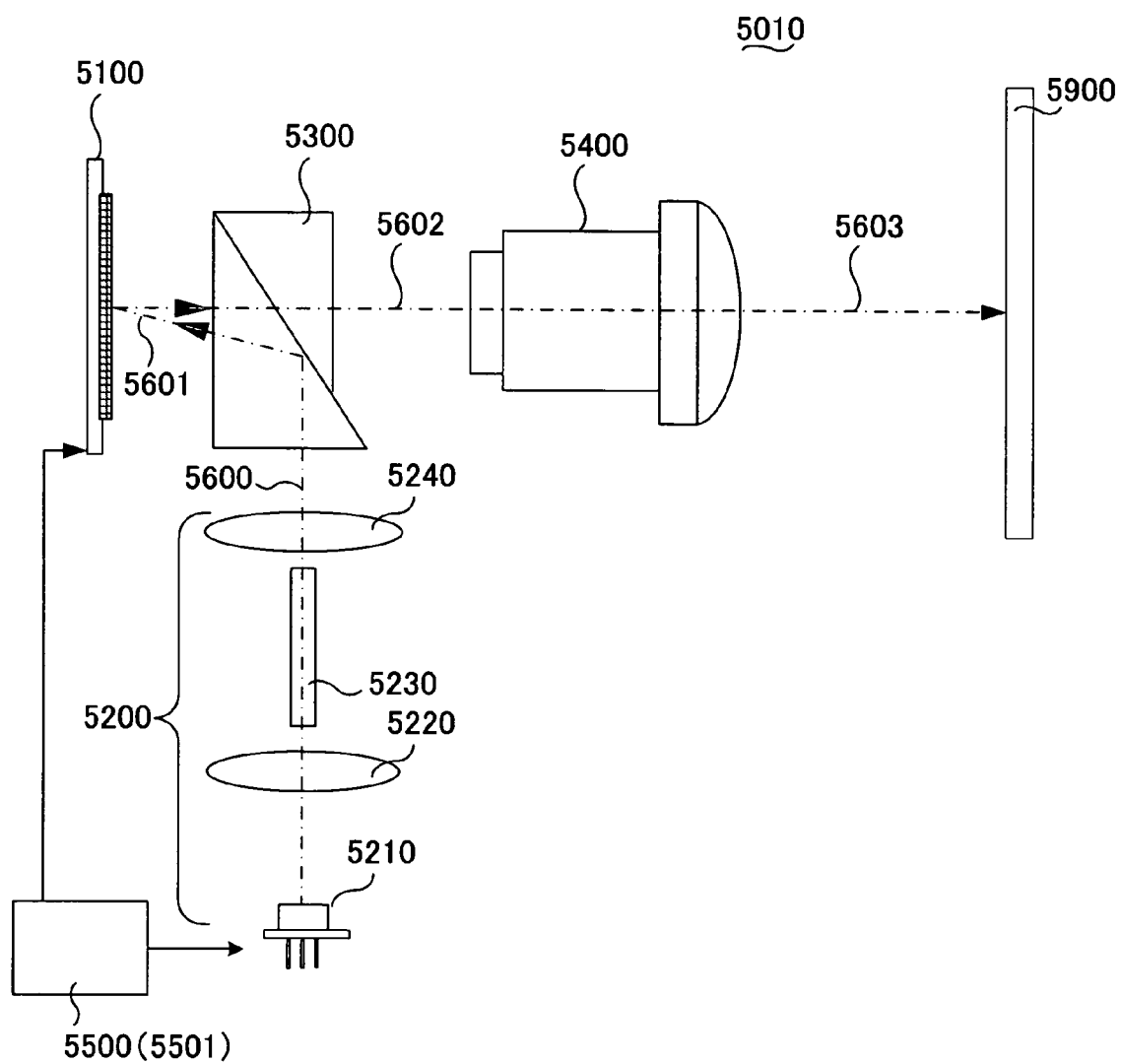
FIG. 6 is a functional block diagram for showing the configuration of a projection apparatus according to the preferred embodiment of the present invention.

FIG. 6 is a functional block diagram for showing the configuration of a projection apparatus according to a preferred embodiment of the present invention.

FIG. 6 shows a projection apparatus 5010 according to the present embodiment comprises a single spatial light modulator (SLM) 5100, a control unit 5500, a Total Internal Reflection (TIR) prism 5300, a projection optical system 5400, and a light source optical system 5200.

The projection apparatus 5010 is a commonly referred to as a single-panel projection apparatus comprising a single spatial light modulator 5100.

The projection optical system 5400 includes the spatial light modulator 5100 and a TIR prism 5300 disposed on the optical axis of the projection optical system 5400, and the light source optical system 5200 is disposed for projecting a light along the optical axis matches with the optical path of the projection optical system 5400.

The TIR prism 5300 receives the incoming illumination light 5600 projects from the light source optical system 5200 and directs the light to transmit as incident light 5601 to the spatial light modulator 5100 at a prescribed inclination angle. The SLM 5100 further reflects and transmits the reflection light 5602, towards the projection optical system 5400. The projection optical system 5400 receives the light 5602 reflected from the SLM 5100 onto a screen 5900 as projection light 5603. The light source optical system 5200 comprises a variable light source 5210 for generating the illumination light 5600, a condenser lens 5220 for focusing the illumination light 5600, a rod type condenser body 5230, and a condenser lens 5240.

The variable light source 5210, condenser lens 5220, rod type condenser body 5230, and condenser lens 5240 are placed in the aforementioned order on the optical axis of illumination light 5600 emitted from the variable light source 5210 and incident to the side face of the TIR prism 5300.

The projection apparatus 5010 employs a single spatial light modulator 5100 for projecting a color display on the screen 5900 by applying a sequential color display method. Specifically, the variable light source 5210 comprises a red laser light source 5211, a green laser light source 5212 and a blue laser light source 5213 (not specifically shown here). The variable light source allows independent controls for the light emission states. The controller of the variable light source performs an operation of dividing one frame of display data into a plurality of sub-fields (i.e., three sub-fields, that is, red (R), green (G) and blue (B) in the present case) and turns on each of the red laser light source 5211, green laser light source 5212 and blue laser light source 5213 to emit each respective light in time series at the time band corresponding to the sub-field of each color as will be described later. In an exemplary embodiment, the light sources are laser light sources. In alternate embodiment, the light sources may also be semiconductor light sources such as the light emitting diodes (LEDs).

Figure 7:
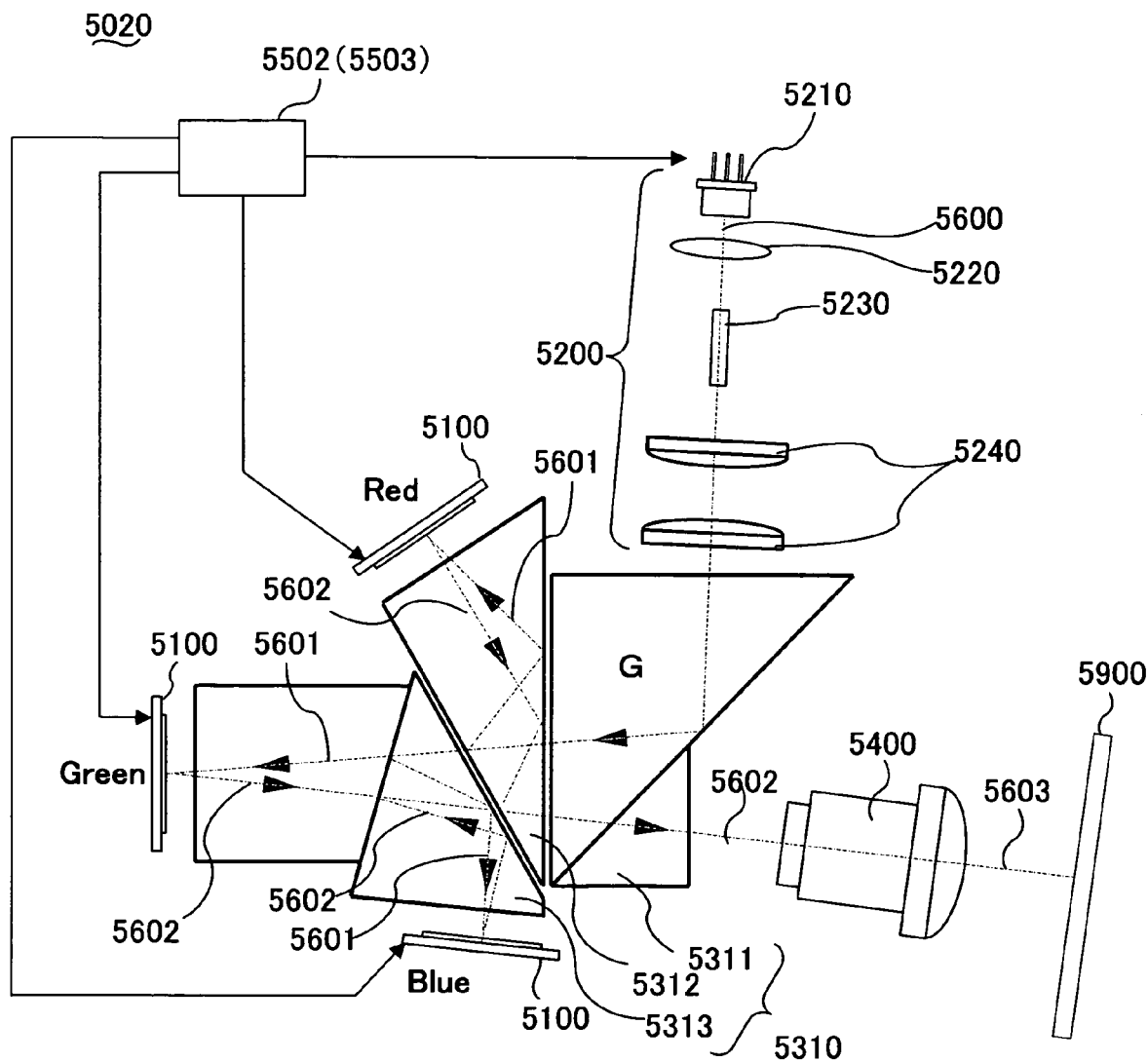
FIG. 7 is a functional block diagram for showing the configuration of a single-panel projection apparatus according to another preferred embodiment of the present invention.

FIG. 7 is a functional block diagram for showing the configuration of a projection apparatus according to an alternate preferred embodiment of the present invention.

The projection apparatus 5020 is commonly referred to as a multiple-plate projection apparatus that includes a plurality of spatial light modulators 5100 instead of a single SLM included in the single-panel projection apparatus 5010 described earlier. Furthermore, the projection apparatus 5020 comprises a control unit 5502 in place of the control unit 5500.

The projection apparatus 5020 comprises multiple spatial light modulators 5100 further includes a light separation/synthesis optical system 5310 between the projection optical system 5400 and each of the spatial light modulators 5100.

The light separation/synthesis optical system 5310 comprises multiple TIR prisms, i.e., a TIR prism 5311, a prism 5312, and a prism 5313.

The TIR prism 5311 directs the illumination light 5600 incidents from the side of the optical axis of the projection optical system 5400 to the spatial light modulator 5100 as incident light 5601.

The TIR prism 5311 carries out the function of directing the illumination light 5600 projected along the optical axis of the projection optical system 5400 and directs the light to the spatial light modulator 5100 as incident light 5601. The TIR prism 5312 carries out the function of separating red (R) light from an incident light 5601, projected by way of the TIR prism 5311, to transmit the red light to the spatial light modulators for the red light 5100, and further carries out the function of directing the reflection light 5602 of the red light to the TIR prism 5311.

Likewise, the prism 5313 carries out the functions of separating blue (B) and green (G) lights from the incident light 5601 projected by way of the TIR prism 5311, and directs the light to the blue color-use spatial light modulators 5100 and green color-use spatial light modulators 5100, and further carries out the function of directing the reflection light 5602 of the green light and blue light to the TIR prism 5311.

Therefore, the spatial light modulations of these three colors, R, G and B carry out these functions simultaneously by these three spatial light modulators 5100. The reflection light 5602, resulting from the respective modulations, is projected onto the screen 5900 as the projection light 5603 by way of the projection optical system 5400, and thus a color display is achieved.

Note that the system may implement various modifications by using a light separation/synthesis optical system instead of the light separation/synthesis optical system 5310 described above.

Figure 8A:
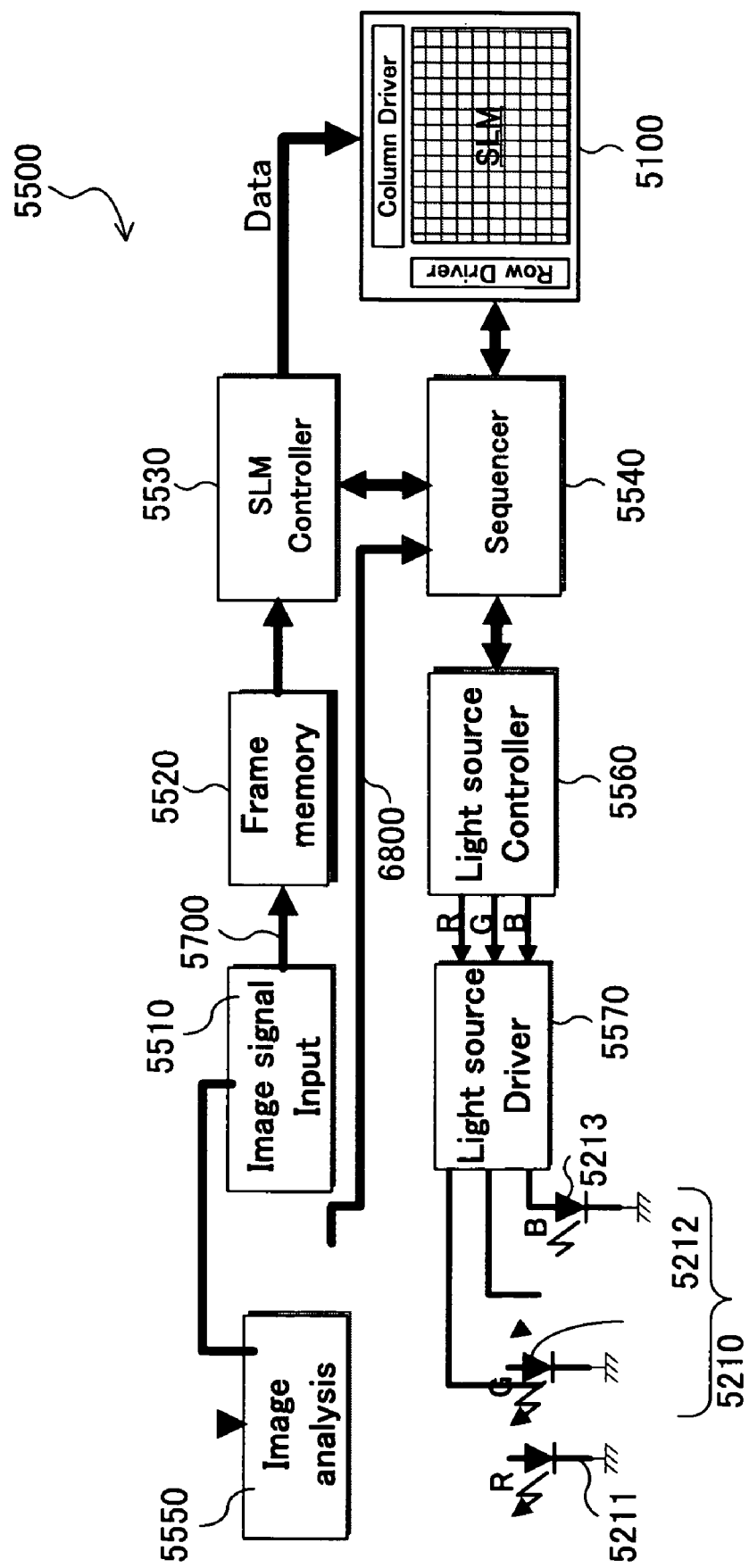
FIG. 8A is a block diagram showing a control unit for a single-panel projection apparatus according to the preferred embodiment of the present invention.

FIG. 8A is a functional block diagram for illustrating the configuration of the control unit 5500 for the above described single-panel projection apparatus 5010. The control unit 5500 comprises a frame memory 5520, an SLM controller 5530, a sequencer 5540, a light source control unit 5560, and a light source drive circuit 5570.

The sequencer 5540, includes a microprocessor to control the operation timing of the entire control unit 5500 and the spatial light modulators 5100.

In one exemplary embodiment, the frame memory 5520 retains one frame of input digital video data 5700 received from an external device (not shown in the figure) connected to a video signal input unit 5510. The input digital video data 5700 is updated in real time whenever the display of one frame is completed.

The SLM controller 5530 processes the input digital video data 5700 from the frame memory 5520 as described later. The SLM controller separates the data read from the memory 5520 into a plurality of sub-fields according to detail descriptions further describe below. The SLM controller outputs the data subdivided into subfields to the spatial light modulators 5100 as binary data 5704 and non-binary data 5705, which are used for implementing an the ON/OFF control and oscillation control (which are described later) of a mirror 5112 of the spatial light modulator 5100.

The sequencer 5540 outputs a timing signal to the spatial light modulators 5100 synchronously with the generation of the binary data 5704 and non-binary data 5705 at the SLM controller 5530.

The video image analysis unit 5550 outputs a image analysis signal 5800 used for generating various light source pulse patterns (which are described later) corresponding to the input digital video data 5700 inputted from the video signal input unit 5510.

The light source control unit 5560 controls the light source drive circuit 5570 to control the operation of the variable light source 5210 by using a light source profile control signal in emitting the illumination light 5600 The light source profile control signal is generated from the image analysis signal 5800 on the basis of the input of the image analysis signal 5800 generated by the video image analysis unit 5550 using data of the light source pulse patterns generated by the sequencer 5540 as will be further described below.

The light source drive circuit 5570 drives the red laser light source 5211, green laser light source 5212, and blue laser light source 5213 of the variable light source 5210 to emit light, respectively. The light source generates the light source pulse patterns 5801 through 5811 (which are described later) received from the light source control unit 5560.

Figure 8B:
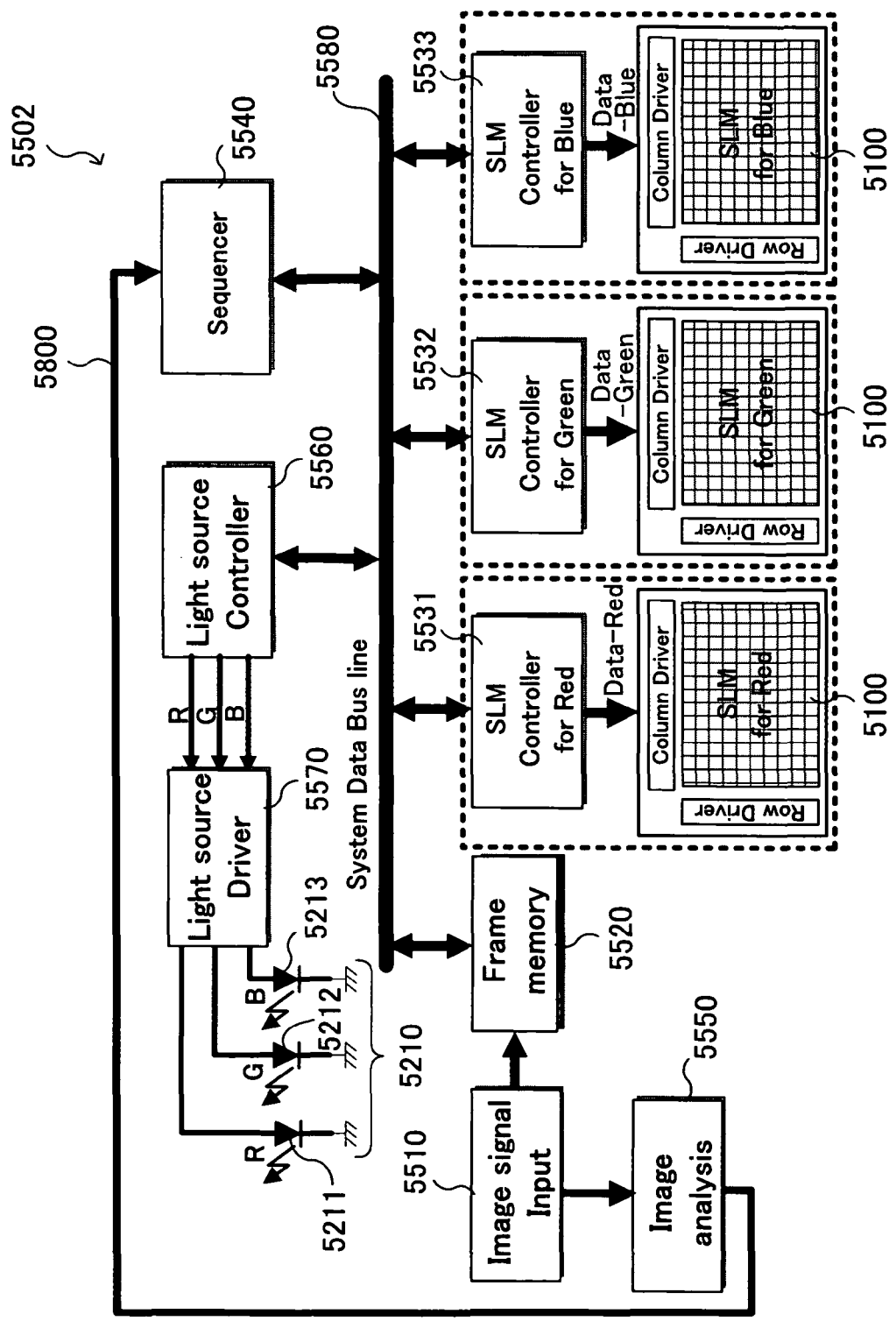
FIG. 8B is a block diagram for showing the configuration of the control unit of a multi-panel projection apparatus according to the preferred embodiment of the present invention.

FIG. 8B is a functional block diagram for illustrating the configuration of the control unit of a multi-panel projection apparatus according to the present embodiment.

The control unit 5502 comprises a plurality of SLM controllers 5531, 5532 and 5533, which are used for controlling each of the spatial light modulators 5100. Each of these modulators is implemented for modulating the respective colors R, G and B, and the configuration of the controllers is the main difference between the control unit 5502 and the control unit 5500 described in FIG. 8A.

Specifically, each of the SLM controller 5531, SLM controller 5532 and SLM controller 5533, is implemented to process the modulation of a respective colors Red, Green, and Blue.

Furthermore, a system bus 5580 is used for connecting the frame memory 5520, light source control unit 5560, sequencer 5540, and SLM controllers 5531 through 5533, in order to speed up and streamline the connection path of each connecting element.

Figure 9:
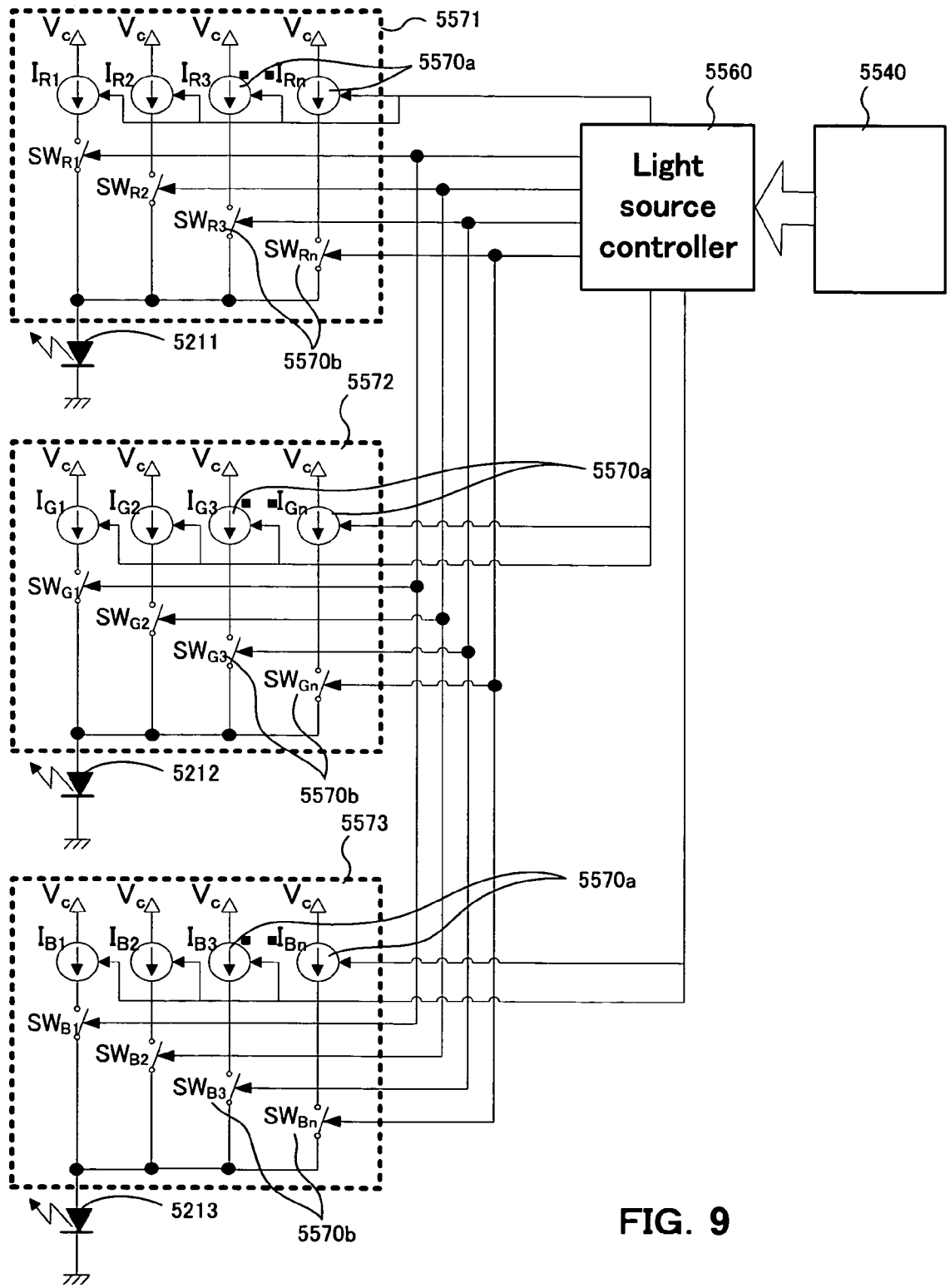
FIG. 9 is a functional block diagram for showing the configuration of the light source drive circuit of a projection apparatus according to the preferred embodiment of the present invention.

FIG. 9 is a functional block diagram for illustrating the configuration of the light source drive circuit 5570 (i.e., the light source drive circuits 5571, 5572, and 5573) according to the present embodiment.

The light source drive circuit illustrated in FIG. 9 comprises multiple constant current circuits 5570a (i.e., I (R, G, B)$_1$ through I (R, G, B)$_n$) and multiple switching circuits 5570b (i.e., switching circuits SW (R, G, B)$_1$ through SW (R, G, B)$_n$), which correspond to their respective constant current circuits 5570a, in order to generate the desired light intensities of emission P$_1$ through P$_n$ for the light source optical system 5200 (i.e., the red laser light source 5211, green laser light source 5212, and blue laser light source 5213).

The switching circuit 5570b switches according to the desired emission profile of the light source optical system 5200 (i.e., the red laser light source 5211, green laser light source 5212, and blue laser light source 5213).

The setup values of the output current of the constant current circuits 5570a (i.e., constant current circuits I (R, G, B)$_n$), when the gray scale of the emission intensity of the light source optical system 5200 is designated at N bits (where N≧n), are as follows:

$$I(R, G, B)_1 = I_{th} + LSB$$

$$I(R, G, B)_2 = LSB + 1$$

$$I(R, G, B)_3 = LSB + 2$$

$$I(R, G, B)_n = MSB.$$

This illustrates that a gray scale display based on emission intensity; a similar gray scale display is achievable even if the emission period (i.e., an emission pulse width), emission interval (i.e., an emission cycle), and the like, are made to be variable.

The relationship between the emission intensity Pn of the variable light source and drive current for each color in this case is as follows. Note that "k" is an emission efficiency corresponding to the drive current:

$$P_1 = k*(I_{th} + I_1)$$

$$P_2 = k*(I_{th} + I_1 + I_2)$$

$$P_n = k*(I_{th} + I_1 + I_2 + \ldots + I_{n-1} + I_n).$$

Figure 10:
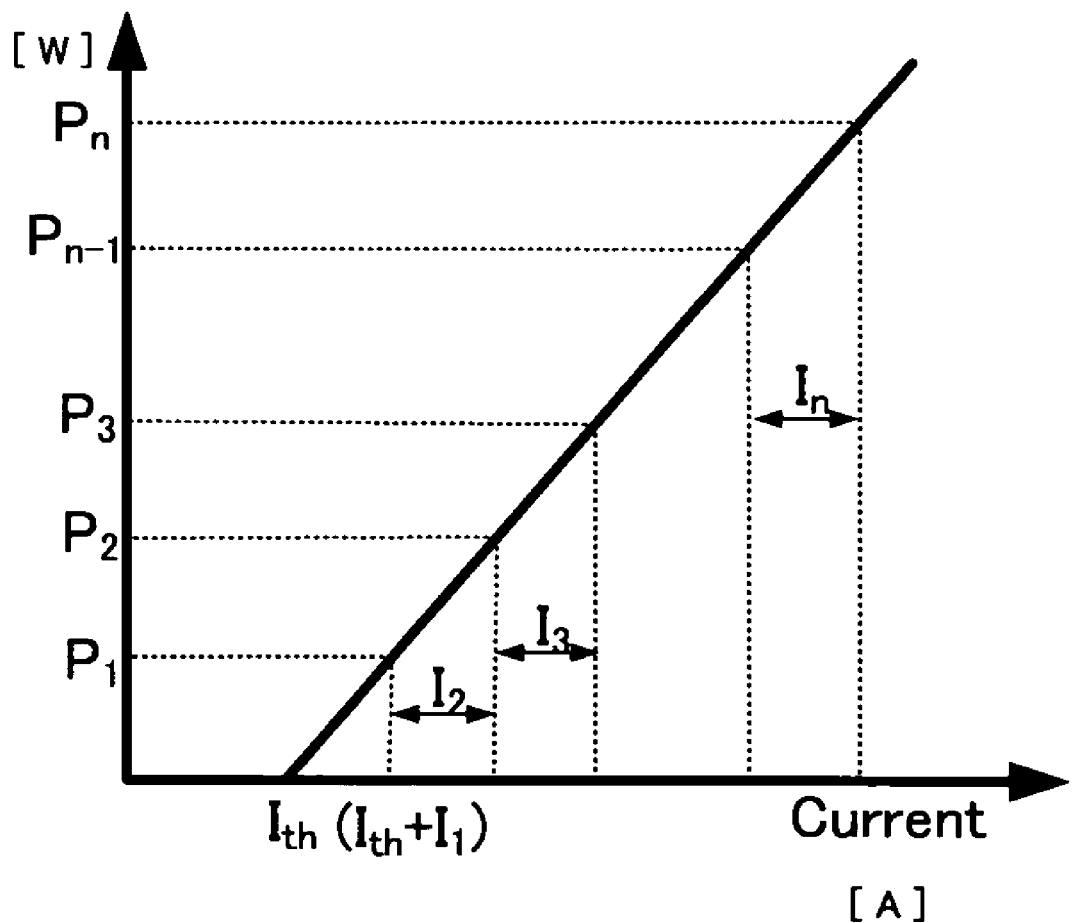
FIG. 10 is a chart showing the relationship between the applied current and the intensity of light emission drive circuit according to the embodiment of the present invention.

FIG. 10 is a chart showing the relationship between the applied current I and emission intensity $P_n$ of the constant current circuit 5570a of the light source drive circuit shown described in FIG. 9.

Note that the description for FIG. 9 illustrates a case of changing the emission profiles of the variable light source for each sub-frame corresponding to each gray scale bit. If the display gray scale function of the spatial light modulator 5100 is used in parallel, the number of required levels of electrical current decreases, enabling a reduction in the numbers of constant current circuits 5570a and switching circuits 5570b. This also makes it possible to obtain a number of gray scales equal to, or higher than, the gray scales of spatial light modulator 5100.

The following detail description explains the configuration of the spatial light modulator 5100 according to the present embodiment.

Figure 12:
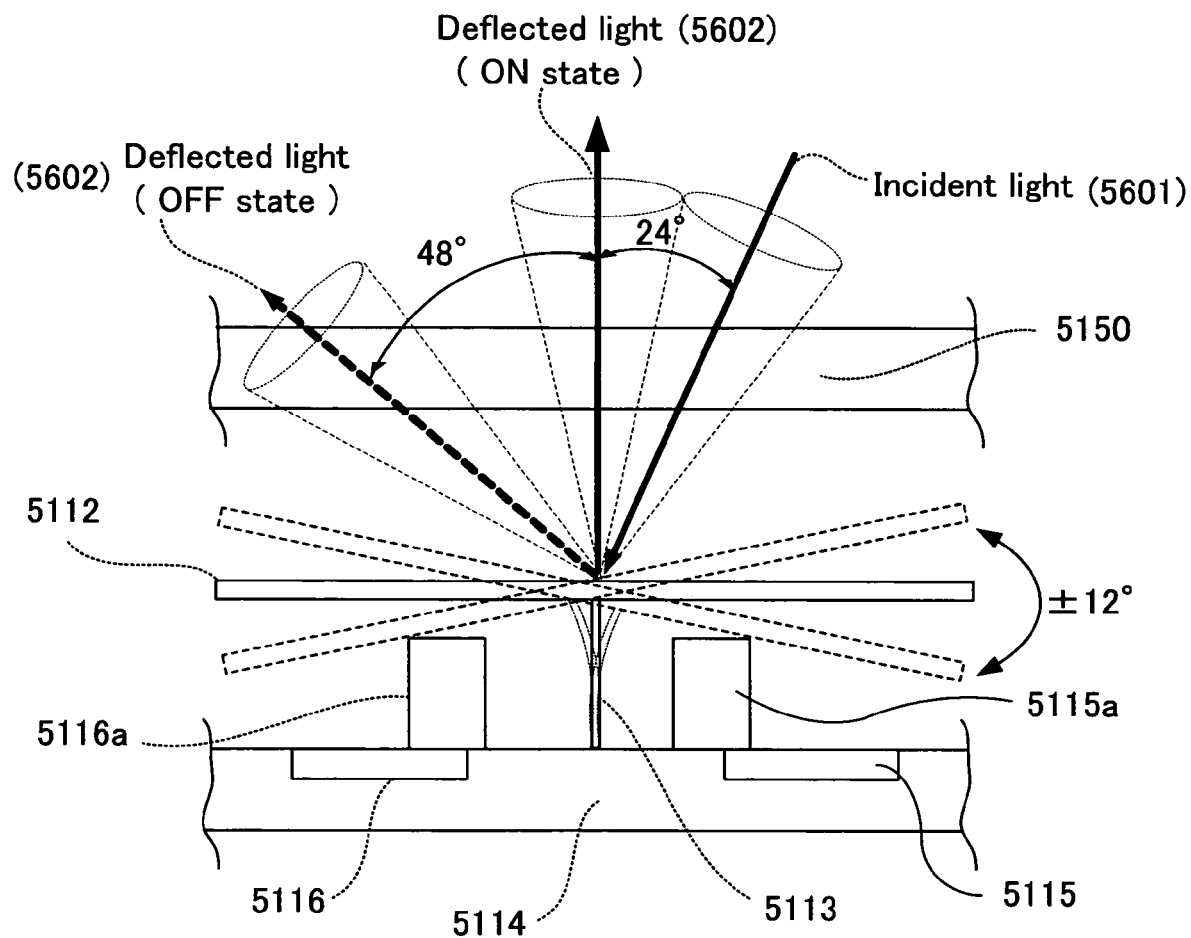
FIG. 12 is a cross-sectional diagram of an individual pixel unit constituting a spatial light modulator according to the preferred embodiment of the present invention.

The spatial light modulator 5100 according to the present embodiment is a deflectable mirror device with an array of mirror elements. FIG. 11 is a schematic circuit diagram for illustrating the layout of the internal configuration of the spatial light modulator 5100 according to the present embodiment. FIG. 12 is a cross-sectional diagram of an individual pixel unit implemented in the spatial light modulator 5100 according to the present embodiment. FIG. 13 shows a side view diagram for illustrating the configuration of individual pixel unit constituting the spatial light modulator 5100 according to the present embodiment.

FIG. 11 shows an exemplary embodiment of the mirror device 5100 that includes a mirror element array 5110, column drivers 5120, ROW line decoders 5130, and an external interface unit 5140. The external interface unit 5140 includes a timing controller 5141 and a selector 5142. The timing controller 5141 controls the ROW line decoder 5130 on the basis of a timing signal from the SLM controller 5530. The selector 5142 supplies the column driver 5120 with a digital signal from the SLM controller 5530. A plurality of mirror elements 4001 are arrayed as a mirror element array 5110 at the positions aligned with individual bit lines. The bit lines are vertically extended from the column drivers 5120, crosses individual word lines. The word lines are horizontally extended from the row decoders 5130.

As shown in FIG. 12, the individual mirror element 5111 includes a mirror 5112 supported on a substrate 5114 by a hinge 5113 to deflect within a range of deflection angles. The mirror 5112 is covered with a cover glass 5150 for protection. The mirror is controlled to operate as an OFF electrode 5116 inclining to and contacting an OFF stopper 5116a, and to operate as an ON electrode 5115 inclining to and contacting an ON stopper 5115a. The ON and OFF angular positions are symmetrical relative to the hinge 5113 on the substrate 5114.

A voltage applied to an OFF electrode 5116 draws the mirror 5112 with a Coulomb force to deflect toward the OFF stopper 5116a. The mirror 5112 reflects the incident light 5601 onto the light path in an OFF direction that is offset from the optical axis of the projection optical system 5400.

A voltage applied to the ON electrode 5115 draws the mirror 5112 with a Coulomb force to deflect toward the ON stopper 5115a. The mirror 5112 reflects the incident light 5601 onto the light path of in ON direction aligned with the optical axis of the projection optical system 5400.

<<Disclosure Content 4>>

The following detail description illustrates the preferred embodiment of the present invention with reference to the accompanying drawings.

The following description is related to alternate embodiments. The description takes into account of the configurations and operations of the projection apparatuses illustrated in the above described FIGS. 6 through 13. Note that the same alphanumeric designations are assigned to the same component d the above descriptions.

As explained above, an image projection apparatus employs a spatial light modulator 5100 implemented as a mirror device. According to the present embodiment, the mirror device is configured to perform a linear gray scale display that is different from a conventional display apparatus such as CRT.

Figure 14:
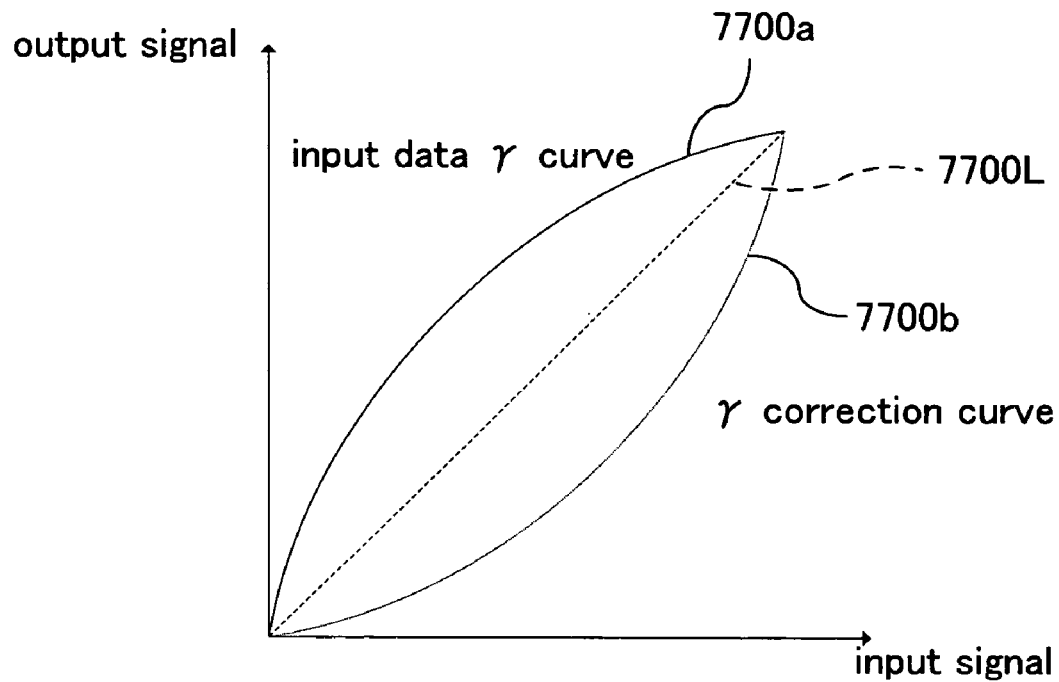
FIG. 14 is a chart for illustrating the principle of a γ correction of video image data

Therefore, FIG. 14, illustrates a γ correction, such as an input data γ curve 7700a, is applied to a piece of input digital video data 5700 at the transmission source (i.e., where the imaging is carried out). Assuming a display in the CRT, a projection apparatus comprising a display device other than the CRT is required to restore the characteristic of a gray scale display to the original state (e.g., a conversion line 7700L for performing a linear conversion of a brightness signal in terms of an input data signal). This is done by means of a correction such as a γ correction curve 7700b and/or to perform various γ corrections in accordance with the characteristics of the projection apparatuses 5010, and 5020.

In such a case, a mathematical operation for the input digital video data 5700, as it is performed in a conventional display device, causes the circuit scale of the control unit 5500 to increase, leading to a higher production cost.

Figure 15:
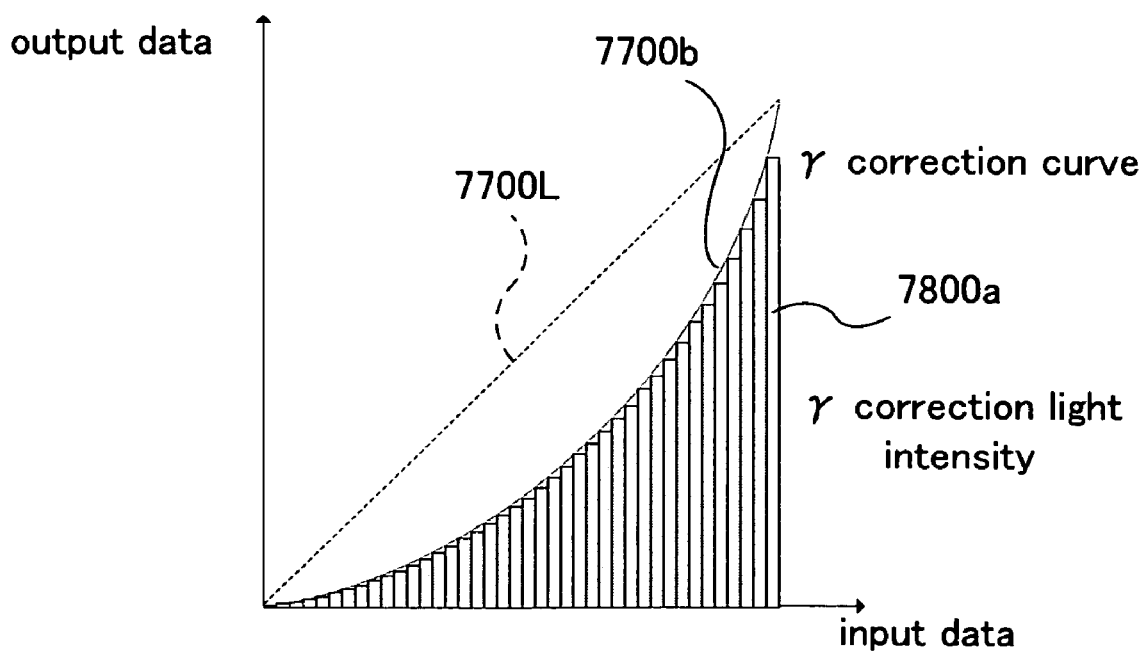
FIG. 15 is a chart for illustrating the principle of a γ correction by controlling the emission intensity of a light source performed in a projection apparatus according to the embodiment of the present invention.

The present embodiment configured so that the above described video image analysis unit 5550 changes the emission pattern of the illumination light 5600 emitted from a variable light source 5210 to the profile, as indicated by a γ correction light intensity variation 7800a, so as to follow the above noted γ correction curve 7700b, as illustrated in FIG. 15. Thereby a linear gray scale display as indicated by the conversion line 7700L is attained by negating the influence of the input data γ curve 7700a performed at the transmission source without requiring a mathematical operation of the input digital video data 5700.

Note that this configuration makes it possible not only to restore the linearity by negating the influence of the input data γ curve 7700a but also to change, intentionally nonlinearly, the emission intensities of the variable light source 5210 within one frame as described below, thereby enabling various and highly precise gray scale displays in excess of the original gray scale control capability of the spatial light modulator 5100.

For example, a video image output (i.e., the input digital video data 5700) contains various scenes such as a dark scene, a bright scene, a generally bluish scene, and a generally reddish scene. The projection apparatus according to the present embodiment is configured to control the gray scale of the emission output of the variable light source 5210 optimally for each scene (with actual control carried out in units of frame), thereby making it possible to attain higher quality video images.

When a γ correction of the input digital video data 5700 (i.e., the input data γ curve 7700a) is implemented by means of a temporal change in emission intensities of the variable light source 5210 as described above, a precise emission control of the variable light source 5210 is difficult if an ON/OFF control of the mirror 5112 is carried out through a pulse width modulation (PWM), which uses the binary data 7704 included in the input digital video data 5700.

Thus, the SLM controller 5530 according to the present embodiment is configured to carry out an ON/OFF control of the mirror 5112 using non-binary data 7705 obtained by converting binary data 7704 as illustrated in FIGS. 16, 17, 18 and 19.

Figure 16:
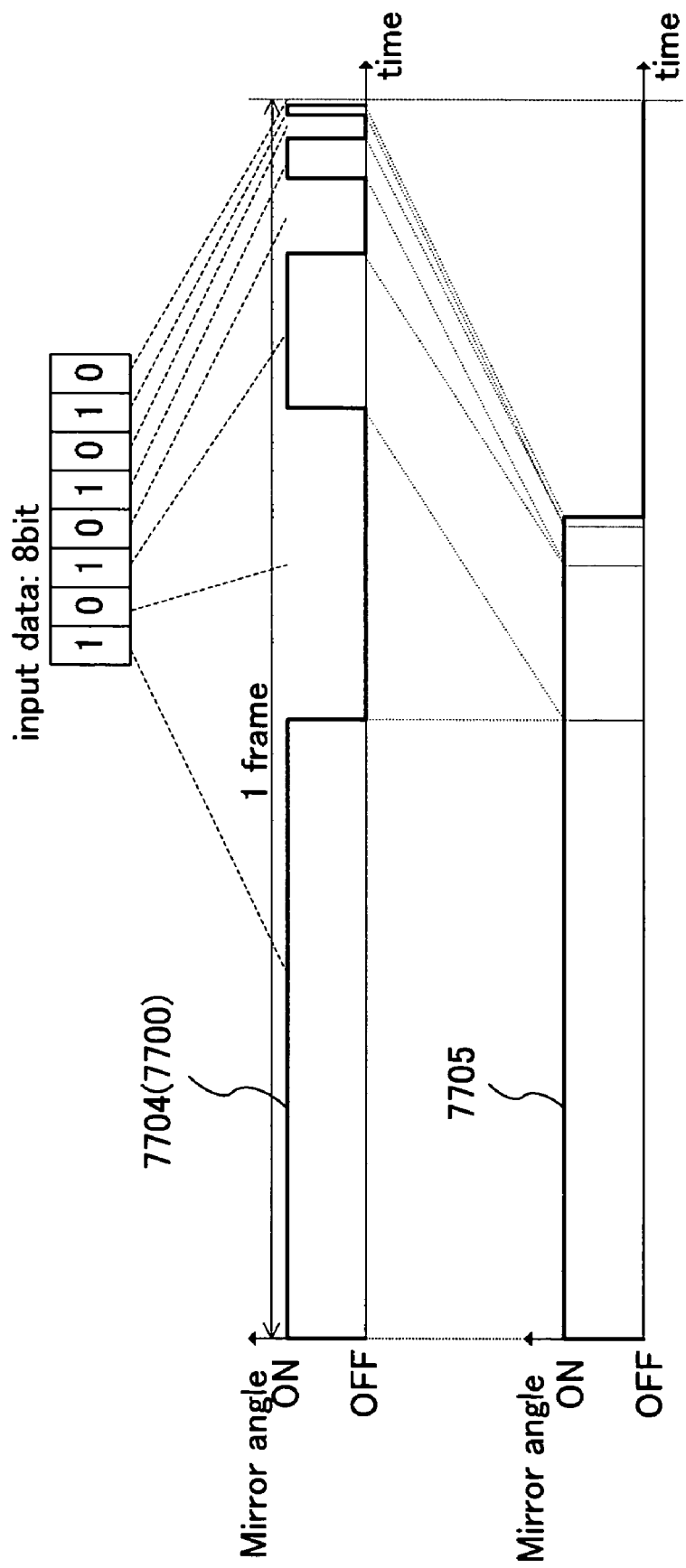
FIG. 16 is a chart for illustrating the conversion of binary data to non-binary data performed in a projection apparatus according to the embodiment of the present invention.

FIG. 16 illustrates 1) the generation of non-binary data 7705 (which is a bit string with each digit being of equal weight) from the binary data 7704 comprising, for example, 8-bit "10101010", and 2) the turning ON of the mirror 5112 only for the period in which the bit string continues.

Note that FIG. 16 illustrates 1) the conversion of non-binary data 7705 so that the bit string is packed forward within the display period of one frame, and 2) the turning ON of the mirror 5112 for a predetermined period in accordance with the bit string number from the beginning of a frame display period.

Figure 17:
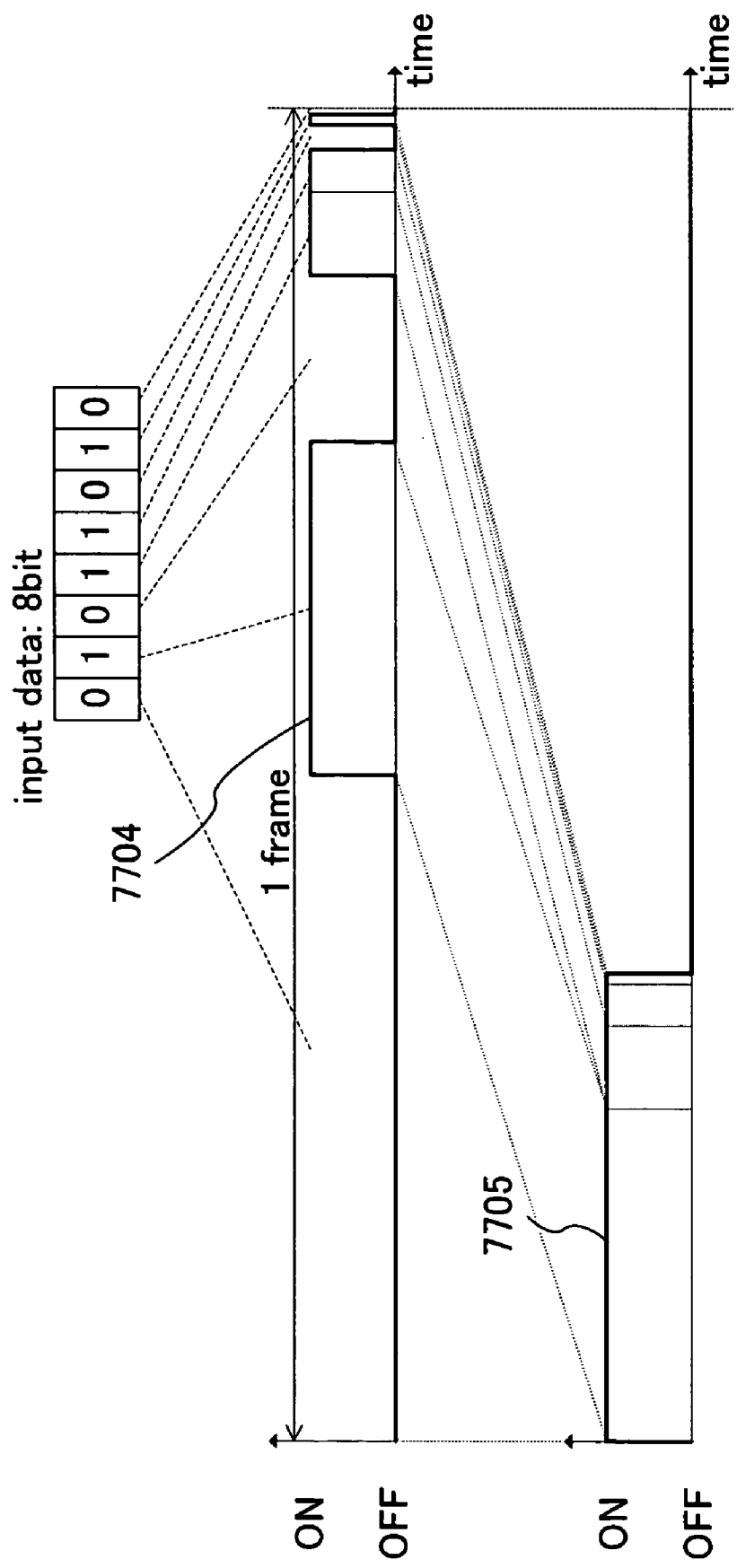
FIG. 17 is a chart for illustrating the conversion of binary data to non-binary data performed in a projection apparatus according to the embodiment of the present invention.

Likewise, FIG. 17 illustrates the conversion of 8-bit "01011010" binary data 7704 into non-binary data 7705, which is a forward-packed bit string.

Figure 18:
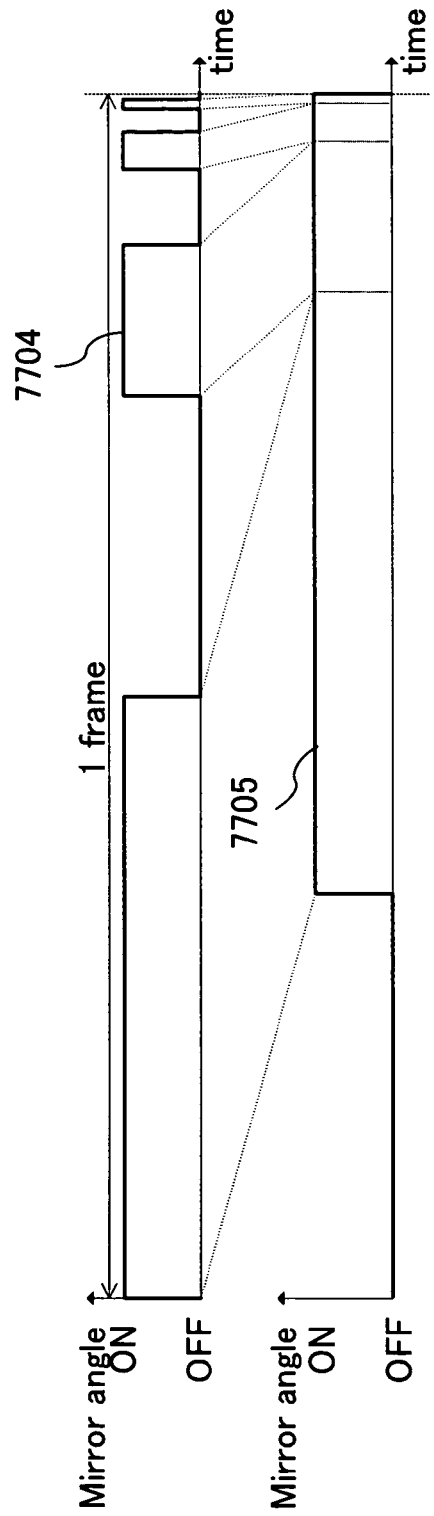
FIG. 18 is a chart for illustrating the conversion of binary data to non-binary data performed in a projection apparatus according to the embodiment of the present invention.

Furthermore, FIG. 18 illustrates the conversion of binary data 7704 illustrated in the above described FIG. 16 into a bit string of non-binary data 7705, with the digits packed backward. In this case, the mirror 5112 turned ON only in the period of time corresponding to the bit string number starting from the middle of a frame display period until the end thereof.

Figure 19:
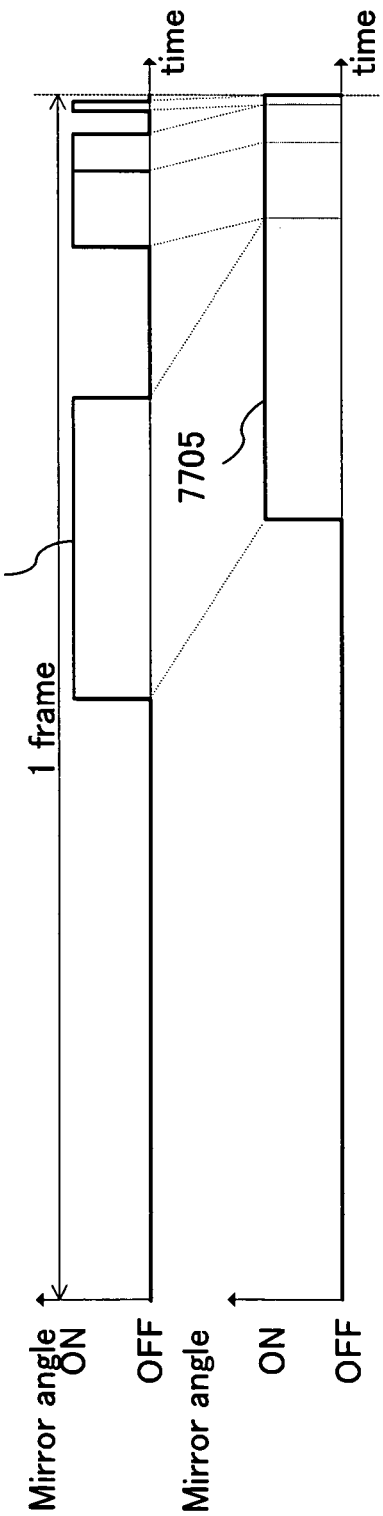
FIG. 19 is a chart for illustrating the conversion of binary data to non-binary data performed in a projection apparatus according to the embodiment of the present invention.

Likewise, FIG. 19 illustrates 1) the conversion of binary data 7704 illustrated in the above described FIG. 17 into a bit string of non-binary data 7705, with the digits packed backward, and 2) the turning ON/OFF of the mirror 5112.

When the ON/OFF is controlled by the non-binary data 7705 as described above, the ON period of the mirror 5112 becomes continuous, and, therefore, control of the emission intensity of the variable light source 5210 synchronous with the aforementioned ON period can be more conveniently achieved.

Figure 20:
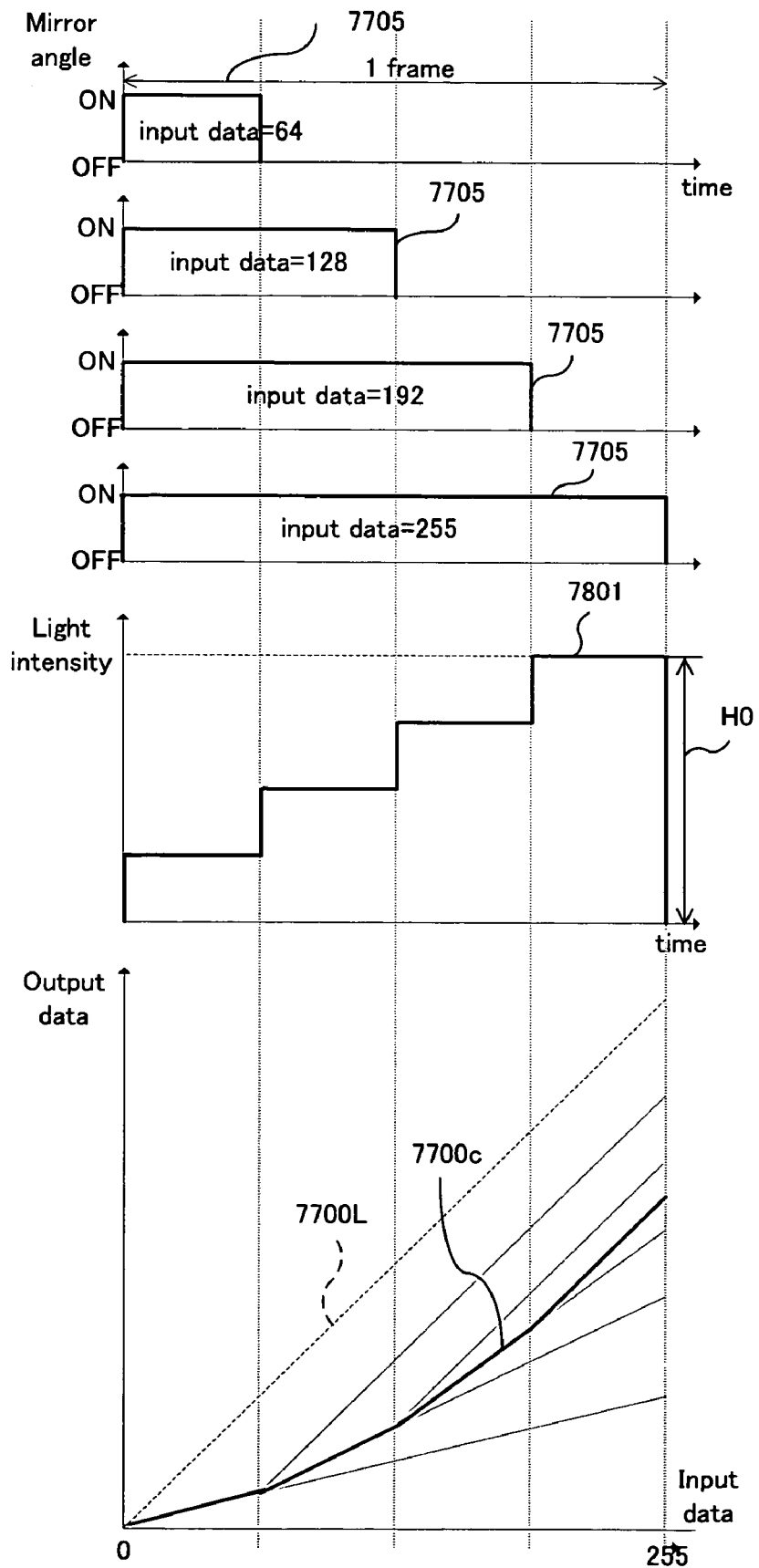
FIG. 20 is a chart showing a γ correction of the brightness input of eight-bit non-binary data. The figure illustrates the implementation in four stages, performed in a projection apparatus according to the embodiment of the present invention.

FIG. 20 illustrates 1) the brightness input of 8-bit non-binary data 7705 into, for example, four steps, i.e., 64, 128, 192 and 255, as shown in the upper rows of FIG. 20, and 2) obtaining a γ correction curve 7700c as shown in the lower row of the drawing through a four-step control of the output intensity of the variable light source 5210 in response to the each of the aforementioned levels, as indicated by a light source pulse pattern 7801 shown in the middle row of the drawing.

FIG. 20 illustrates the sequence of this control process in four steps. A further minute grouping of the non-binary data 7705 makes it possible to obtain a smoother curve than the γ correction curve 7700c.

Note that FIG. 20 shows that the correction amount of the γ correction curve 7700c is less bright when compared with the conversion line 7700L. Accordingly, the emission pattern of the variable light source 5210 may be controlled so as to move a γ correction curve 7700d closer to the above described conversion line 7700L (as indicated in the bottom part of FIG. 21). This is done by increasing the emission intensity of the light source pulse (from the emission intensity H0 to the emission intensity H1) toward the tail end of the display period of one frame as indicated by a light source pulse pattern 7802, as illustrated in FIG. 21.

Figure 21:
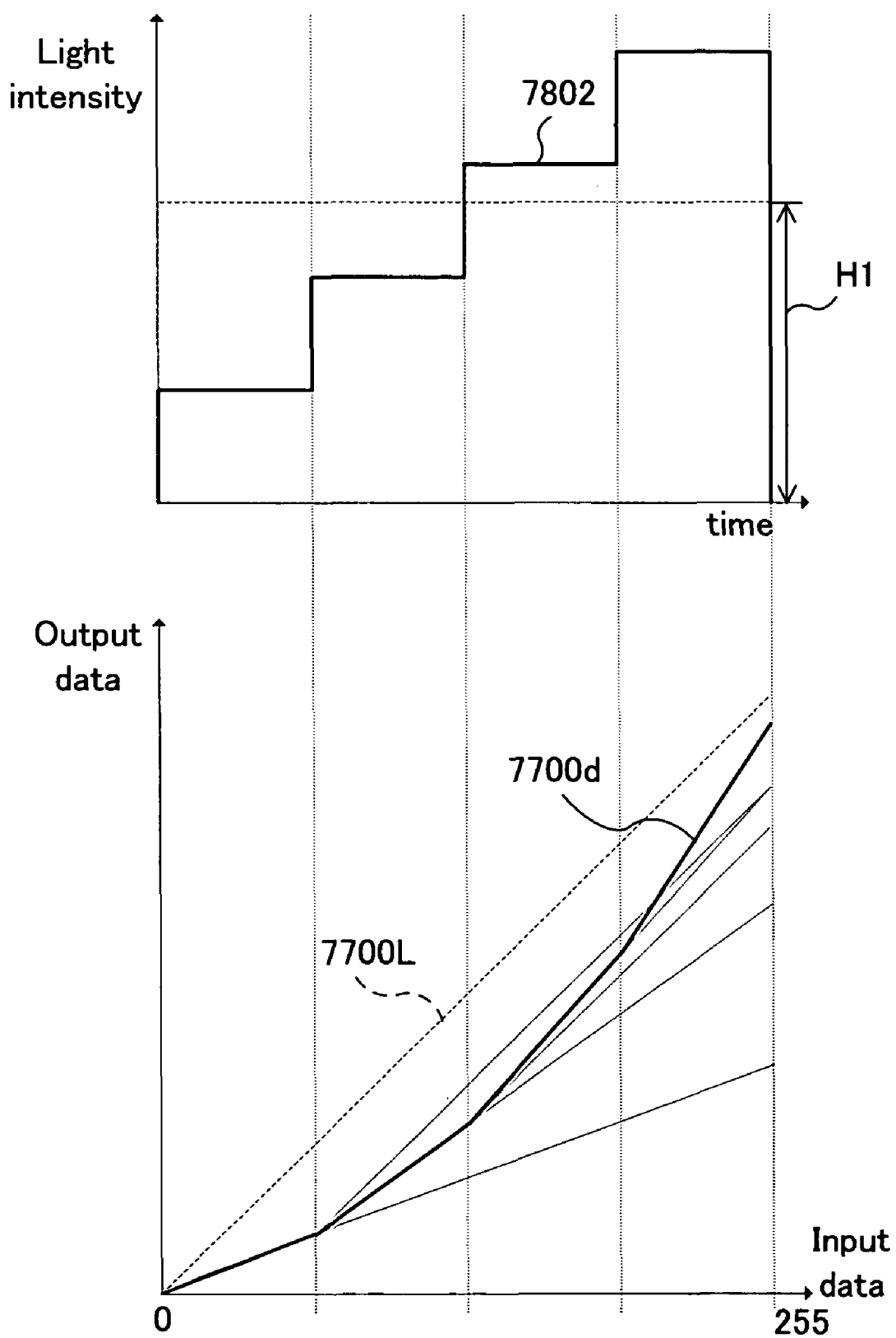
FIG. 21 is a chart showing a γ correction of the brightness input of eight-bit non-binary data. The illustrates a modification of the implementation in four stages, performed in a projection apparatus according to the embodiment of the present invention.

FIGS. 20 and 21 illustrate a γ correction by changing the emission intensity while maintaining the variable light source 5210 so that it continuously emits light, as indicated by the light source pulse patterns 7801 and 7802. The control may be performed by means of an intermittent pulse emission.

Figure 22:
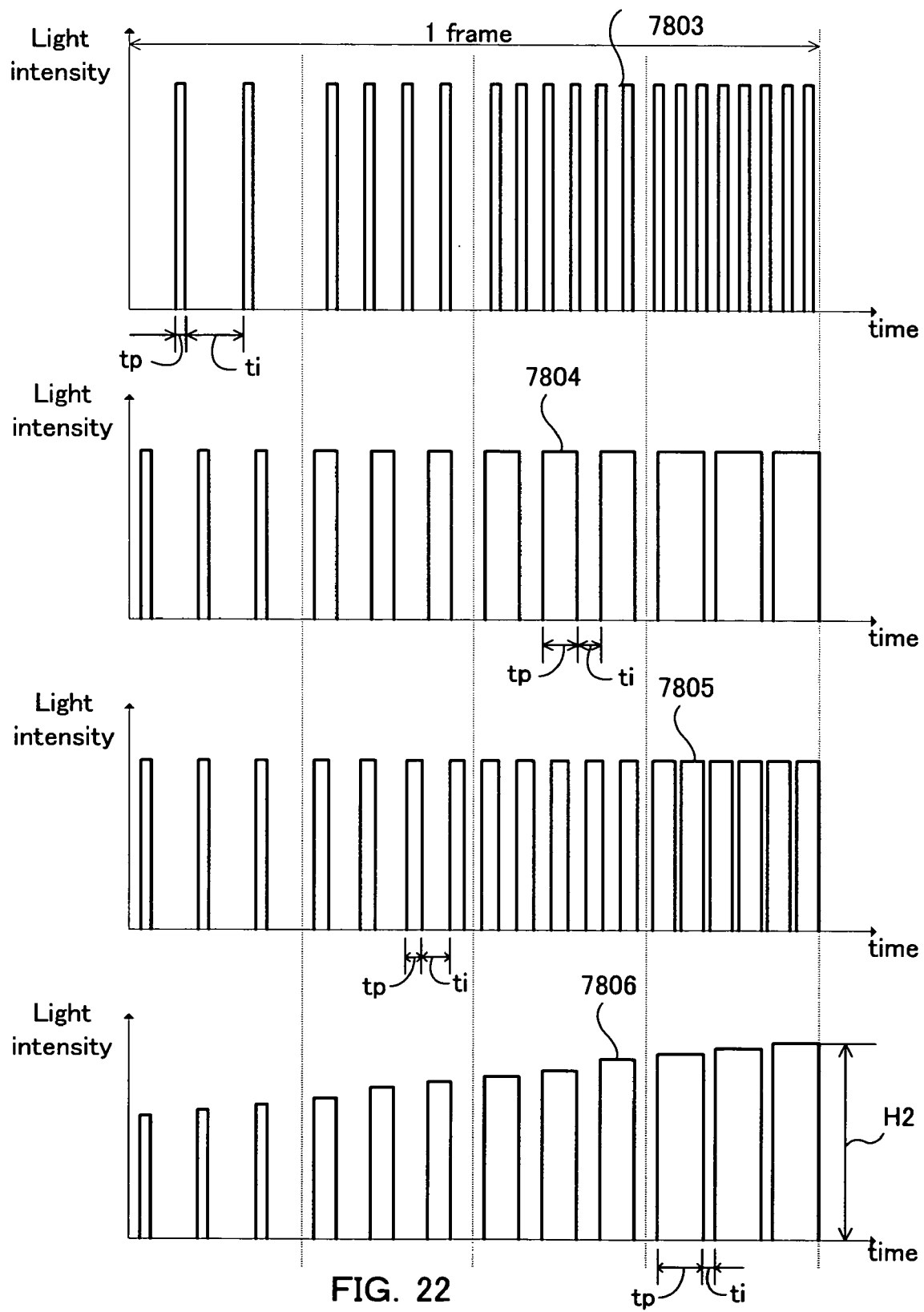
FIG. 22 is a chart for showing a γ correction by means of an intermittent pulse emission performed in a projection apparatus according to the embodiment of the present invention.

FIG. 22 illustrates a control by means of the aforementioned intermittent pulse emission. A light source pulse pattern 7803 illustrated in FIG. 22 generates emission pulses with a pulse width tp. This is done intermittently in emission pulse intervals ti and increases the number of emission pulses per unit time by gradually decreasing the emission pulse interval ti between the beginning and end of the display period of one frame. This thereby achieves an effect similar to that of the above described continuous light source pulse patterns 7801 and 7802. Furthermore, the light source pulse pattern 7804 illustrates the gradual increase of the emission pulse width tp between the beginning and end of the display period of one frame. Additionally, the light source pulse pattern 7805 illustrates the gradual decrease of the emission pulse intervals ti and also the gradual increase of the emission pulse width tp between the beginning and end of the display period of one frame. Then, the light source pulse pattern 7806 illustrates the gradual increase of both the emission pulse width tp and the emission intensity H2 between the beginning and end of the display period of one frame.

Figure 23A:
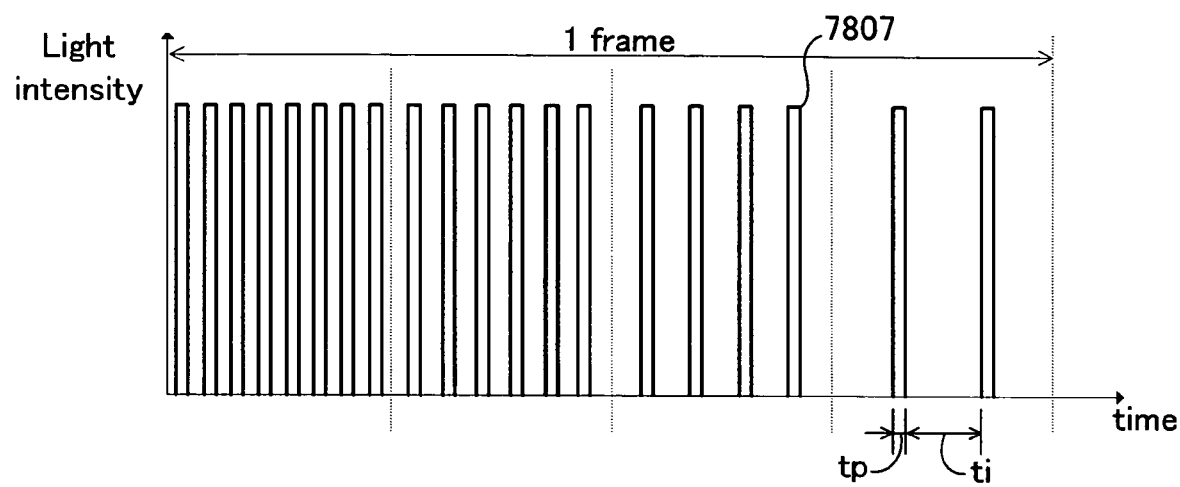
FIG. 23A is a chart for showing a γ correction by means of an intermittent pulse emission, thereby increasing the correction of the lower brightness side, performed in a projection apparatus according to the embodiment of the present invention.
Figure 23B:
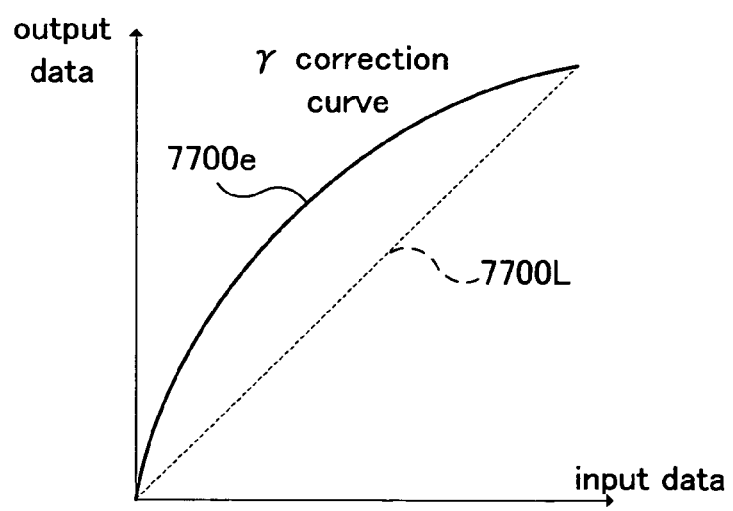
FIG. 23B is a chart for showing the γ correction curve performing a γ correction by means of a light source pulse pattern illustrated in FIG. 23A, which increases on the correction of the lower brightness side.

FIGS. 23A and 23B illustrate a γ correction curve 7700e performing γ correction to more effectively correct the lower brightness side by means of a light source pulse pattern 7807.

Therefore, the light source pulse pattern 7807 shown in FIG. 23A controls the emission pattern of the variable light source 5210 so as to cause the generation of multiple emission pulses. These have a constant emission pulse width tp (with a small emission pulse interval)) on the start side (i.e., the lower density side) of the display period of one frame. to the light source pulse pattern 7807 gradually decreases the number of pulses (that is, the emission pulse interval ti gradually increases) toward the end of the display period. The control process makes it possible to attain a γ correction curve 7700e, which is convex-shaped toward the top-left of the conversion line 7700L, and which, accordingly, provides more effective correction, i.e., increasing brightness, on the lower brightness side, as illustrated in FIG. 23B.

Figure 24A:
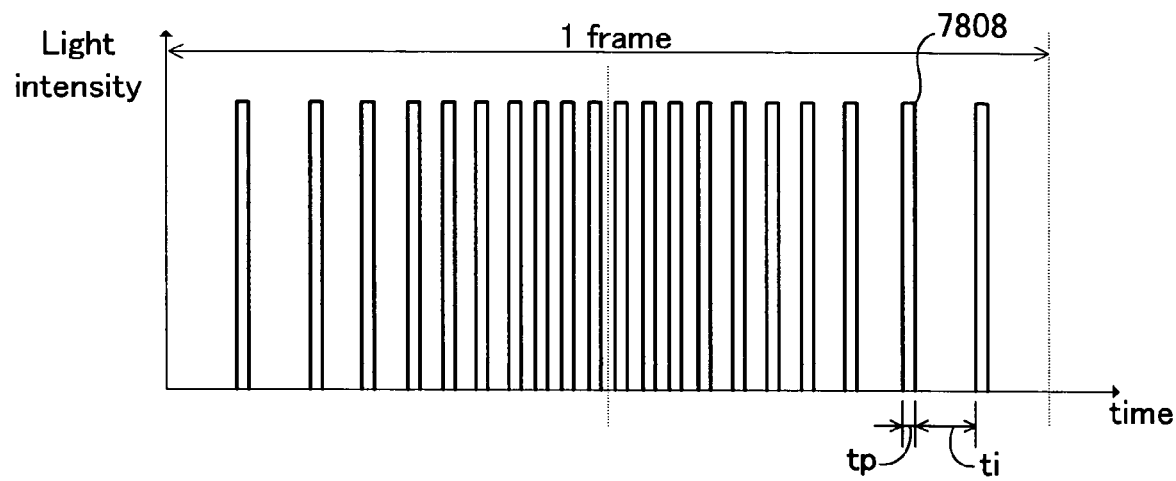
FIG. 24A is a chart for illustrating a γ correction with consideration for human vision by means of an intermittent pulse emission in a projection apparatus according to the embodiment of the present invention.
Figure 24B:
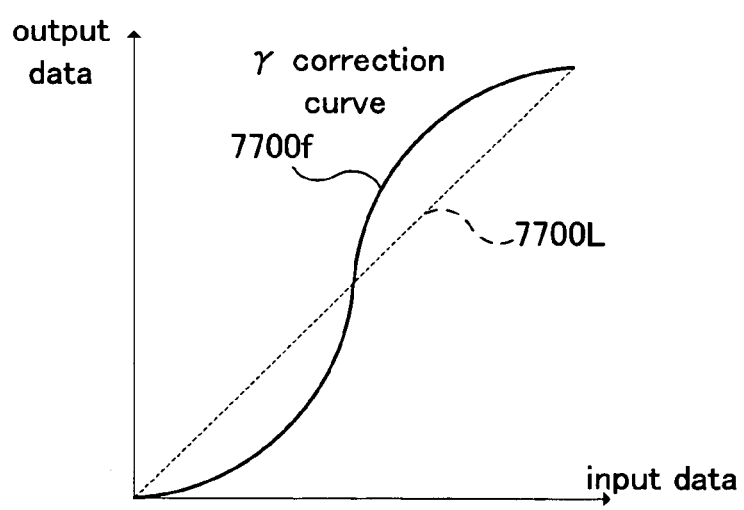
FIG. 24B is a chart for illustrating a γ correction with consideration for human vision by means of the light source pulse pattern exemplified in FIG. 24A.

FIGS. 24A and 24B illustrate a γ correction with consideration given to human vision. This is done by a control of the variable light source 5210 with a light source pulse pattern 7808. The human eye is highly sensitive to the mid-range of low and high brightness. Accordingly, a γ correction is performed by controlling the variable light source 5210 with the light source pulse pattern 7808, which 1) causes emission pulses to have the same emission pulse width tp with a small emission pulse interval ti at the center of the display period of one frame and 2) gradually decreases the density of the emission pulse toward either side, as illustrated in FIG. 24A. This control achieves a γ correction using a γ correction curve 7700f that is smaller than the conversion line 7700L on the lower brightness side and larger than that on the higher brightness side, thereby making it possible to obtain a modulated and clear projection image, i.e., darker on the lower brightness side and brighter on higher brightness side, as shown in FIG. 24B. Also, when gamma correction by means of modulation in the light source as implemented in the present embodiment is performed after a conventional gamma correction with the above mathematical operation, by using a gamma correction circuit, it is possible to perform a more effective gamma correction to the mirror device than the conventional correction.

The following description discloses an example of expanding the number of display gray scales by performing a modulation control of the accumulated maximum light intensity in the display period of one frame, which corresponds to the variable light source 5210 of each color so as to obtain a desired output light intensity corresponding to the pixel data indicating the maximum brightness. The maximum gray scale output provided by a spatial light modulator 5100 is determined by the operation speed of the ON/OFF control of a mirror (more specifically, however, it is affected by other factors such as single-panel comprisal versus multi-panel comprisal and the number of sub-frames it is to be divided into). For example, if an 8-bit gray scale output is the maximum according to the operation speed of the mirror 5112, a 256-step gray scale, i.e., "0" through "255", can be the output. If a single color gradation is displayed, the gradation is 256 steps; the gradation recognition capability of humans exceeds 256 steps (it is believed that 12-bit gray scale would suffice) so that the display does not present a smooth gradation to the human eye.

In practice, however, there are few scenes that output the entire gray scales of "0" through "255", and, instead, there are more cases of outputs ranging only from "0" through "128", such as in a movie, or even darker gray scale images. Human visual recognition capability is particularly equipped to detect differences in gray scale in dark areas than in bright areas. Therefore a person tends to recognize as an outline a minute difference in brightness in a dark image.

The present embodiment is accordingly configured to perform a modulation control of an accumulated maximum light intensity in the display period of one frame corresponding to the variable light source 5210 of each color so that a desired output light intensity corresponding to the maximum brightness pixel data is obtained. This control makes it possible to express the brightness from the brightest part (i.e., the pixel) to the total darkness (i.e., "0" brightness) of a scene (i.e., frame) with the maximum gray scale output of a mirror, thereby smoothing and refining the video image, especially in a dark image.

Figure 25:
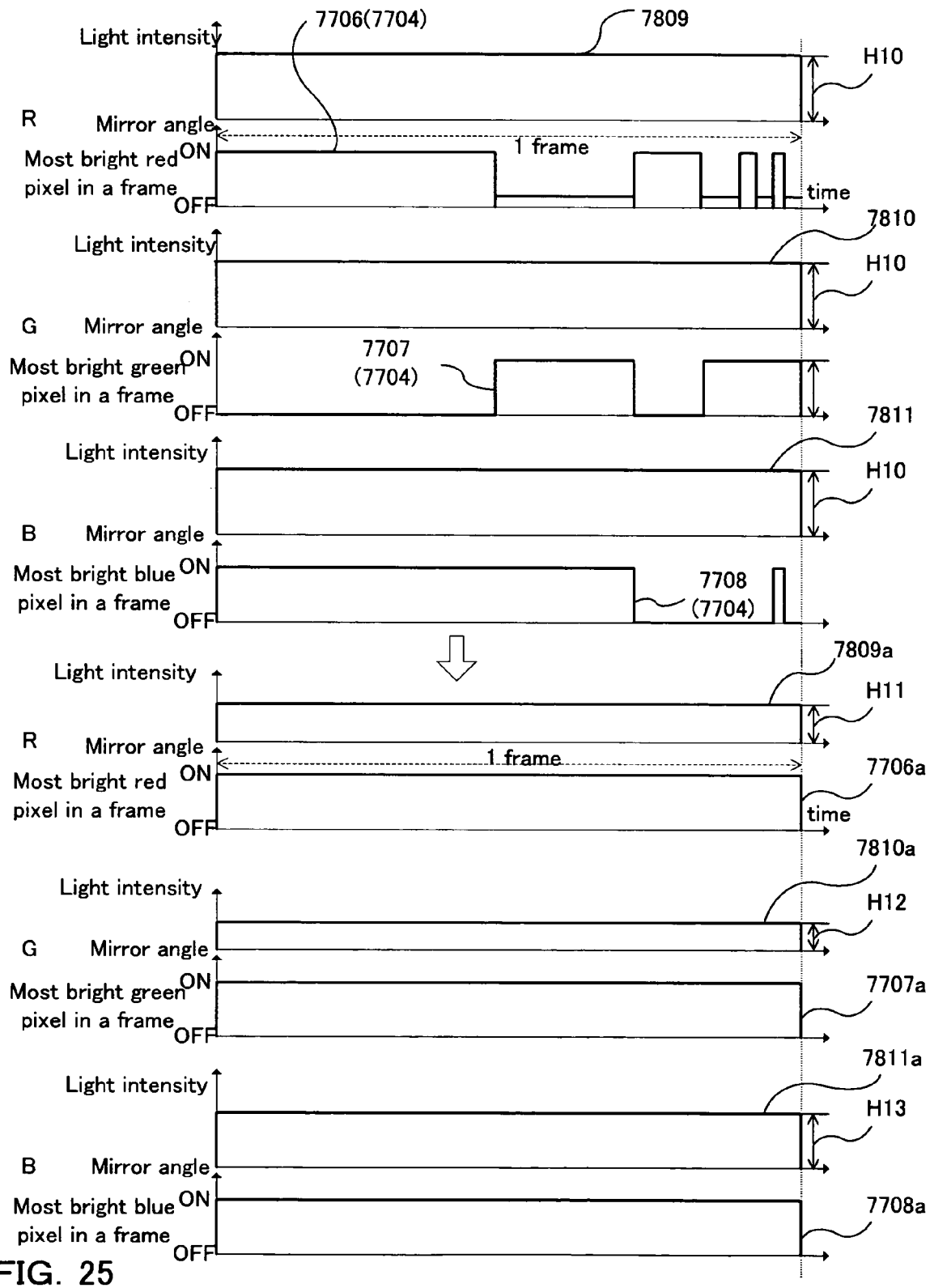
FIG. 25 is a chart for illustrating gray scale control by keeping a mirror in a constant ON state and controlling the intensity of light emission, which is performed in a multi-panel projection apparatus according to the embodiment of the present invention.

The upper part of FIG. 25 shows 1) variable light sources 5210 (i.e., the red laser light source 5211, the green laser light source 5212, and the blue laser light source 5213) continuously emitting light at a constant emission intensity H10 in the gray scale display control of the respective colors in, for example, the multi-panel projection apparatus 5020 and 2) the turning ON/OFF of the mirrors 5112 in accordance with the mirror control profile 7706 (for red), mirror control profile 7707 (for green), and mirror control profile 7708 (for blue) by means of the PWM, and thereby achieving a gray scale display.

When controlling a gray scale by means of the ON/OFF control of the mirror 5112, a smooth gray scale cannot be expressed because the expression depends on the gray scale expression of the data width of the input digital video data 5700. Furthermore, the light sources of the respective colors have a constant emission state irrespective of changes in the gray scale, thereby wasting the emission energy.

In contrast, the present embodiment maintains the mirror 5112 of a pixel, which indicates the maximum brightness, continuously at the ON state (in accordance with the mirror control profiles 7706a, 7707a and 7708a) and sets the variable light sources 5210 (i.e., red laser light source 5211, green laser light source 5212, and blue laser light source 5213), which output the illumination light 5600, at emission intensities H11 (for red), H12 (for green), and H13 (for blue). These correspond to the gray scale data indicating the maximum brightness, and the gray scale control of each color illustrated on the lower side of FIG. 25. Therefore, the gray scale can be expressed by the maximum gray scale output (that is, a continuous ON state in one frame period) of the mirror 5112, thereby smoothing out and refining the video image, especially in a dark scene.

Furthermore, the brightness of the colors R, G, and B is attained by the increase/decrease in the intensity of the illumination light 5600 output from the corresponding variable light sources 5210 (i.e., the red laser light source 5211, the green laser light source 5212, and the blue laser light source 5213), thereby saving energy, reducing an unnecessary light component, and improving the contrast in the video image.

Figure 26:
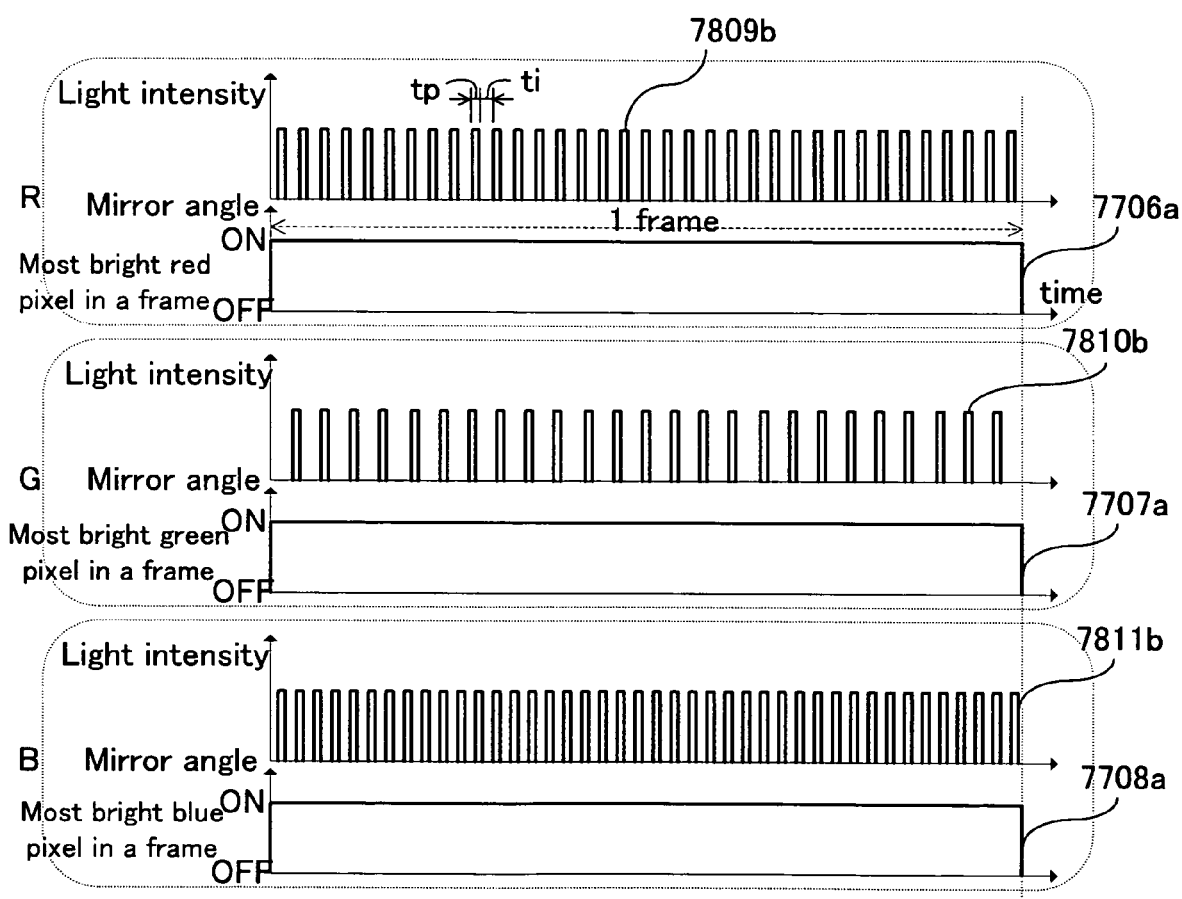
FIG. 26 is a chart for illustrating gray scale control by keeping a mirror in a constant ON state and controlling the pulse emission of a light source, which is performed in a multi-panel projection apparatus according to the embodiment of the present invention.

Note that while the above described FIG. 25 illustrates the variable light sources 5210 as continuously turned on at the emission intensities H11, H12, and H13, in the gray scale control of the respective colors, the variable light sources 5210 may be controlled with an intermittent emission pulse, as shown in FIG. 26.

That is, in FIG. 26, the mirror 5112 of a pixel indicating the maximum brightness is maintained at a continuous ON state in one frame period, as represented by the mirror control profiles 7706a, 7707a and 7708a in the display control of the respective colors. The variable light sources 5210 are configured to pulse-emit in accordance with the emission pulse width tp and emission pulse interval ti, as represented by light source pulse patterns 7809b (for red), 7810b (for green), and 7811b (for blue). In this event, the number of emission pulses is controlled so that the total intensity of the emission pulse is equivalent to the gray scale data of a pixel indicating the maximum brightness. Also in this event, the gray scale can be expressed by the maximum gray scale output (that is, a continuous ON state in one frame period) of the mirror 5112, thereby smoothing out and refining the video image, especially in a dark scene. Furthermore, the brightness of the colors R, G and B are attained by the increase/decrease in the intensity of the corresponding variable light sources 5210 (i.e., red laser light source 5211, green laser light source 5212, and blue laser light source 5213), which saves energy and reduces an unnecessary light component, and improves the contrast in the video image.

Figure 27:
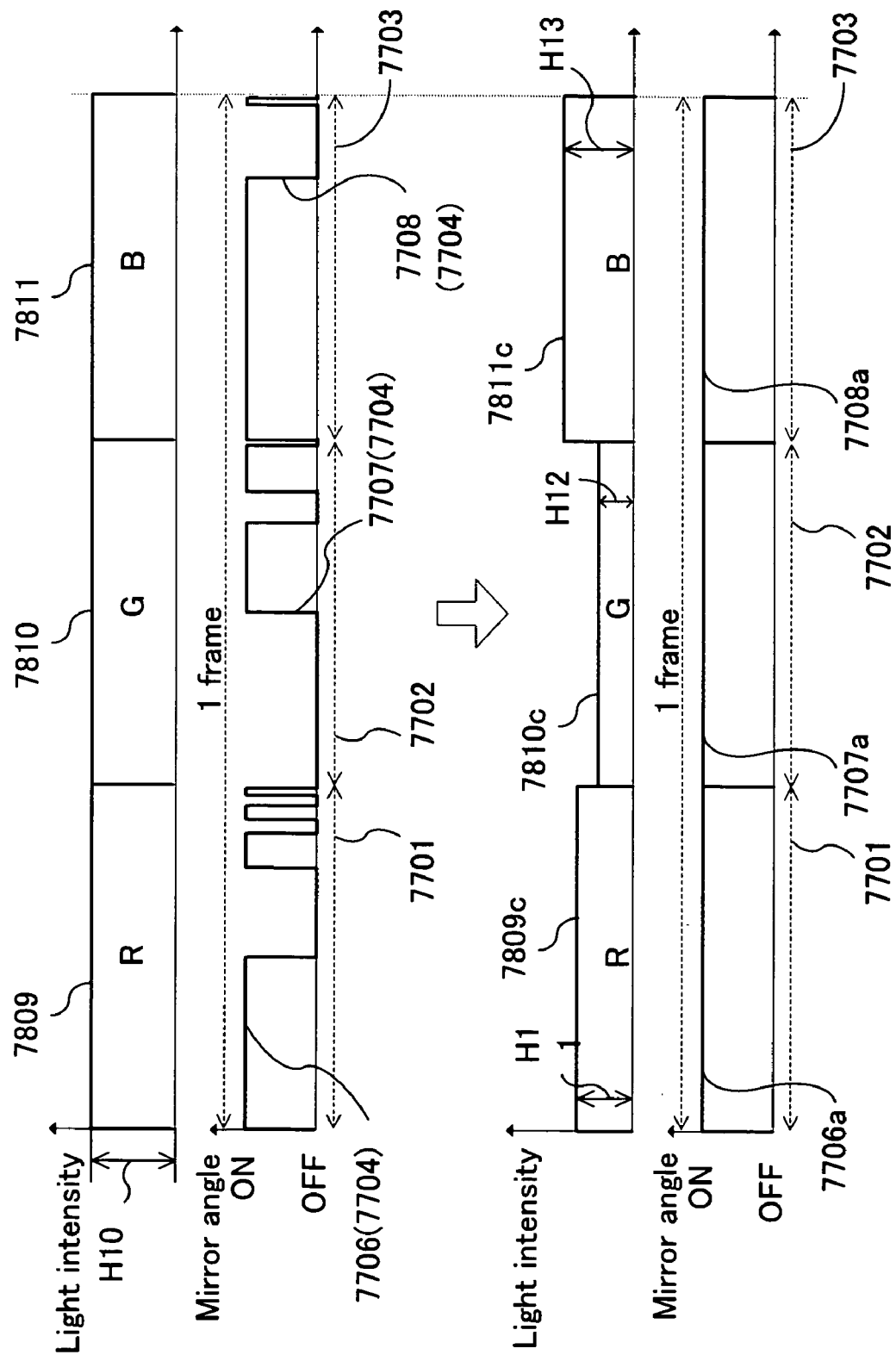
FIG. 27 is a chart for illustrating gray scale control by keeping a mirror in a constant ON state and controlling the intensity of emission of a light source, which is performed in a single-panel projection apparatus according to the embodiment of the present invention.

FIG. 27 illustrates a gray scale control when the gray scale control illustrated in FIGS. 25 and 26 is applied to a single-panel projection apparatus 5010. In this case, the display period of one frame is divided into multiple subfields 5701, 5702, and 5703 corresponding to the colors R, G, and B, respectively, and a color display is attained by a color sequence method. However, with the conventional method, the ON/OFF control for the mirror 5112 is performed, by means of a PWM, in accordance with the mirror control profiles 7706 (for red), 7707 (for green), and 7708 (for blue)

in the respective subfields, and the variable light sources 5210 perform a continuous emission at a constant intensity level in accordance with the light source pulse patterns 7809, 7810 and 7811, thereby performing a gray scale control, as shown on the upper part of FIG. 27. In this case, a gray scale expression depends on that of the data width of input digital video data 5700 and therefore a smooth gray scale expression cannot be attained as described above.

In contrast, as shown on the lower part of FIG. 27, the present embodiment is configured to perform a control so that the mirror 5112 of a pixel indicating the maximum brightness is controlled to the ON state in the entire display period of one frame (i.e., the entire subfields) in accordance with the mirror control profiles 7706a, 7707a, and 7708a, and so that the intensity of the variable light sources 5210 are set at an intensity equivalent to the gray scale data of a pixel indicating the maximum brightness (i.e., the emission intensities H11 (for red), H12 (for green) and H13 (for blue)). Therefore, the gray scale can be expressed by the maximum gray scale output (that is, a continuous ON state during the period of one frame) of the mirror 5112, thus smoothing out and refining the video image, especially in a dark scene.

Figure 28:
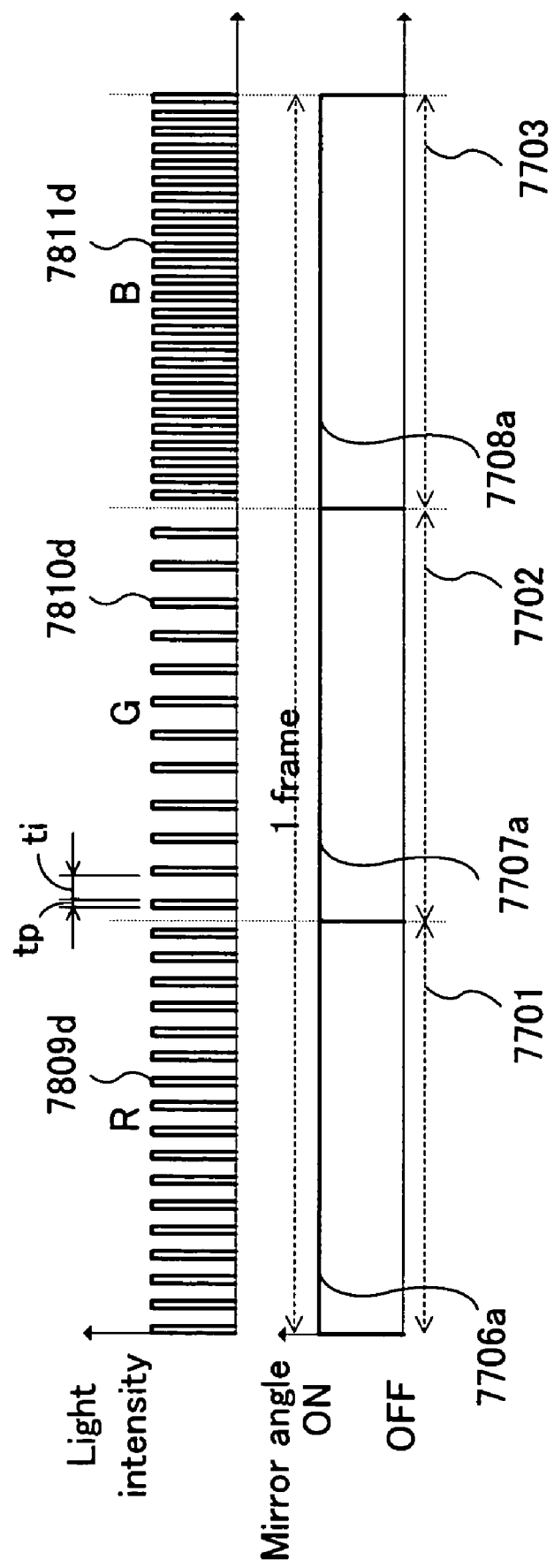
FIG. 28 is a chart for illustrating gray scale control by keeping a mirror in a constant ON state and controlling the pulse emission of a light source, which is performed in a single-panel projection apparatus according to the embodiment of the present invention.

FIG. 28 shows the attainment of an intensity equivalent to the above described emission intensities H11, H12, and H13 by adjusting the emission pulse width tp and emission pulse interval ti of the emission pulse by means of an intermittent pulse emission of the variable light sources 5210 in the respective subfields of red, green, and blue. Thus an effect similar to the case described FIG. 27 is obtained.

Figure 29:
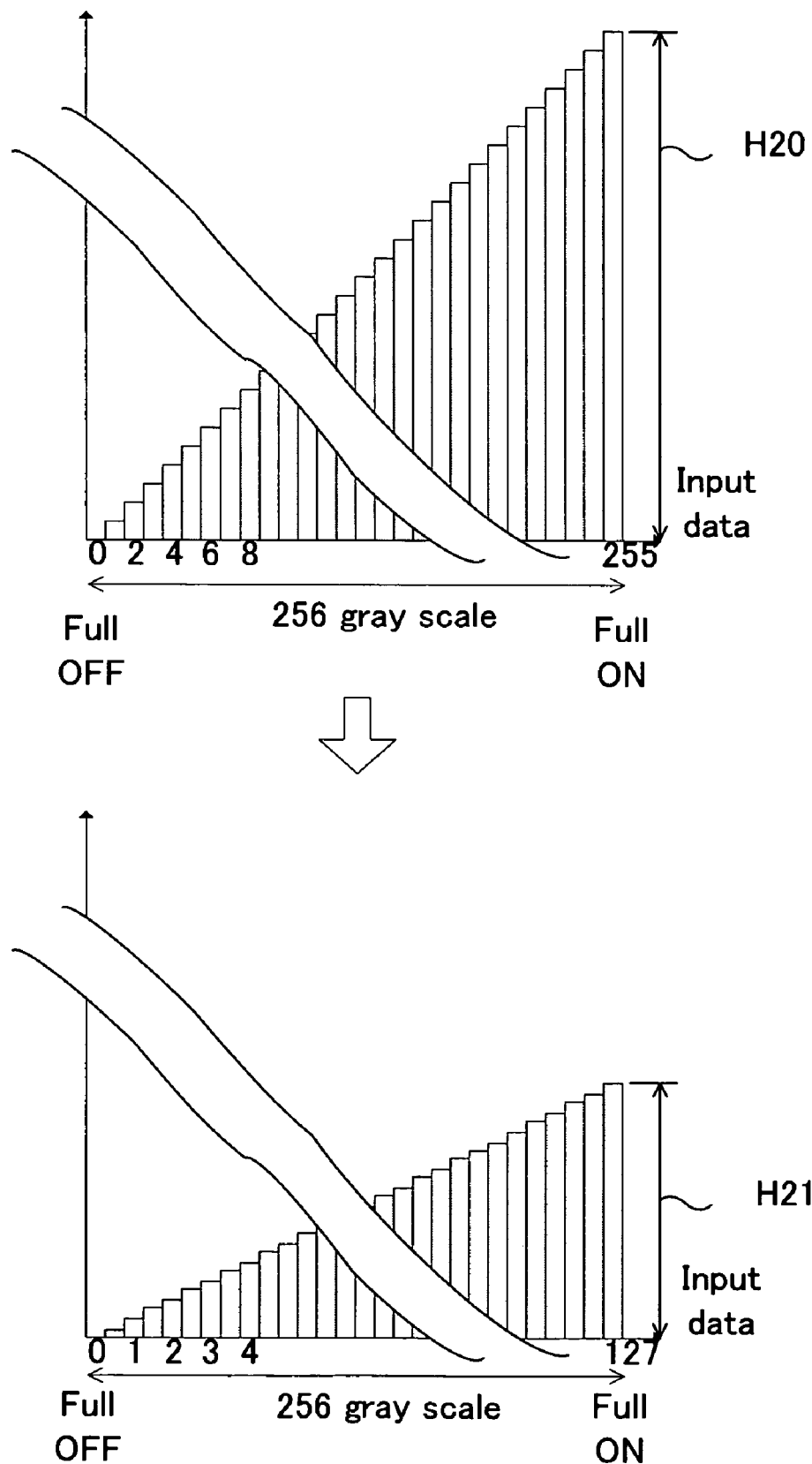
FIG. 29 is a diagram for showing the principle of increasing the range of gray scale control by a combination of the ON/OFF control of a mirror and the emission intensity control of a light source, which is performed in a projection apparatus according to the embodiment of the present invention.

FIG. 29 shows the capability of a grayscale control with a wider dynamic range than the emission intensity of the variable light source 5210 by combining the ON/OFF control of the mirror 5112 and the emission intensity control of the variable light source 5210 in the above-described examples. Accordingly, if the emission intensity level of the variable light source 5210 is constant at the emission intensity H20, with a gray scale expression in 256 steps, that is, "0" through "255", in accordance with input digital video data 5700 being possible only in the range between the full ON and full OFF of the mirror 5112, and a pixel indicates the maximum brightness as half the light intensity, i.e., "0" through "127", then only a 128-step gray scale, i.e., "0" through "127", can be expressed, as shown on the upper part of FIG. 29.

In contrast, if the emission intensity of the variable light source 5210 is controlled to maintain the emission intensity H21 of the variable light source 5210 at one half of the emission intensity H20, as in the present embodiment, then it is possible to attain a 256-step grayscale expression, i.e., "0" through "255", in the range between the full ON and full OFF states of the mirror 5112, as shown on the lower part of FIG. 29.

For this reason, the range of the grayscale expression can exceed the designation range of the input digital video data 5700, thus improving the image quality.

The following description explains countermeasures for prevent the problem of a color break. In the case of a multi-panel projection apparatus comprising multiple spatial light modulators 5100, as in the above described projection apparatus 5020, there is a concern that, if the output time for each color is different, a state in which only a certain color is outputted is created, resulting in the occurrence of a color break, in which the individual colors R, G, and B are seen separately. Accordingly, the present embodiment is configured to equip the SLM controller 5530 to control the mirror 5112 of the spatial light modulators 5100 so that during either the transition between the ON and OFF states, or the intermediate output state, the mirror 5112 oscillates between the ON and OFF states. Furthermore, if the brightness output value to be modulated is no smaller than the brightness output of the intermediate output state during the entire display period of one frame for each color, the modulation is performed between the ON state and intermediate output state of the mirror 5112 for the display period of one frame for each color.

Figure 30:
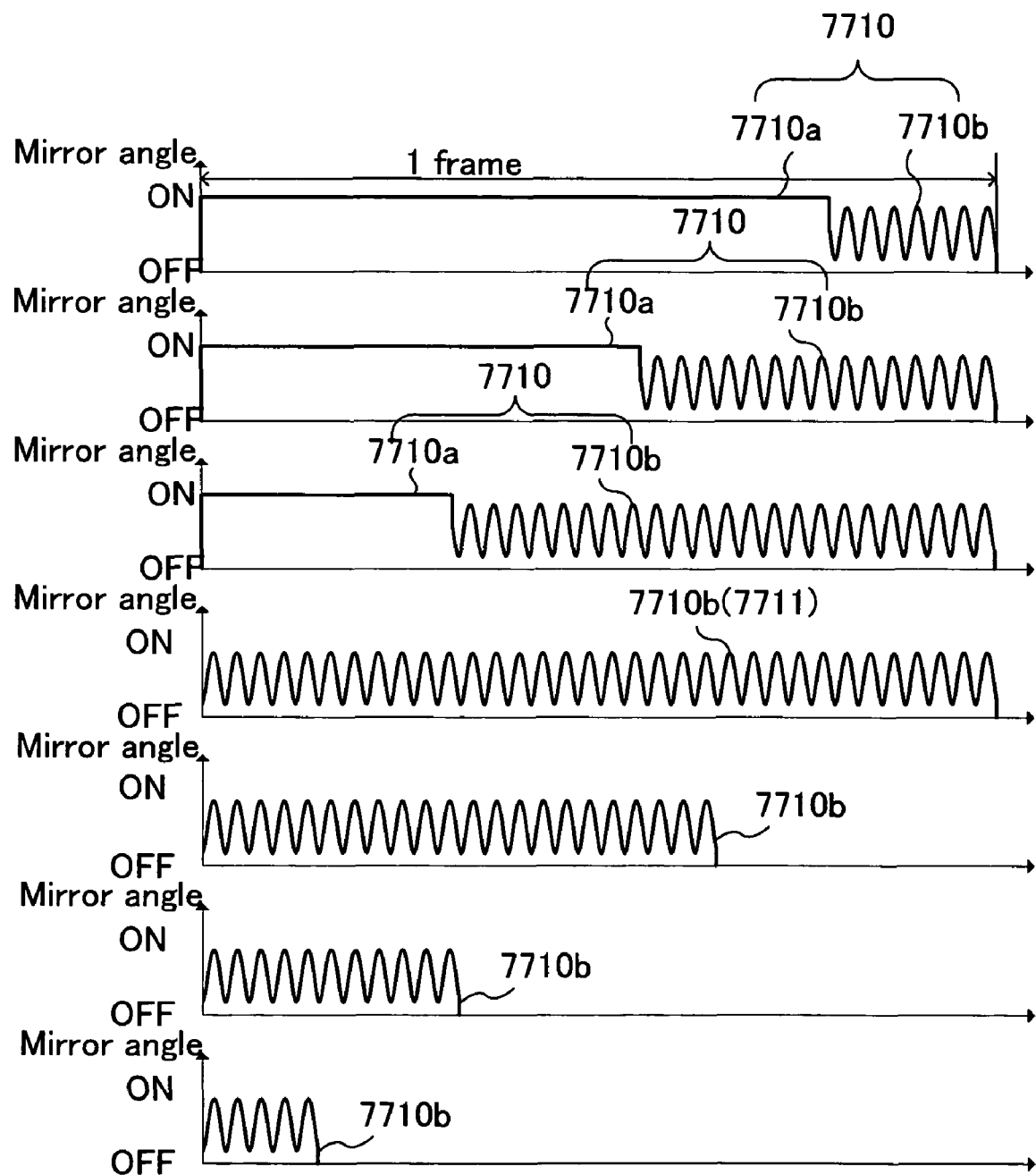
FIG. 30 is a chart for illustrating the prevention of color break by a combination of the ON/OFF control of a mirror and the oscillation control of the mirror performed in a projection apparatus according to the embodiment of the present invention.

FIG. 30 illustrates a countermeasure for a color break. The mirror control profile 7711 shown at the center of FIG. 30 indicates a brightness output carrying out a mirror oscillation control 7710b during the entire display period of one frame for each color. Furthermore, the present embodiment is configured to continue to output light during the entire display period of one frame through a combination of a mirror ON/OFF control 7710a and a mirror oscillation control 7710b as indicated by the mirror control profile 7710 on the top side of FIG. 30, wherein the brightness output is no less than the mirror control profile 7711. In contrast, when the brightness output is no more than the mirror control profile 7711, the necessary brightness output is attained by controlling a continuation time period of the mirror oscillation control 7710b during the display period of one frame, as shown on the lower side of FIG. 30.

The control illustrated in FIG. 30 makes it easy to align the output time for each color, thereby reducing occurrence of a color break in the projection apparatus 5020 comprising multiple spatial light modulators 5100. Note that, if a grayscale control is carried out by controlling the intensity through setting the emission pulse width tp and emission pulse interval ti of the variable light source 5210, as in the above described FIGS. 26, 28, etc., the light source control unit 5560 is also capable of increasing the maximum brightness of the variable light source 5210. This is done by selectively narrowing the emission pulse interval ti within a specific time during a one-frame period, for a frame of a specific condition of the input digital video data 5700, when the output of the illumination light 5600 is modulated by varying the emission pulse interval ti (i.e., the emission interval cycle) of the pulse emission of the variable light source 5210.

This takes advantage of the maximum brightness of the variable light source 5210 by widening the dynamic range of a video image output, thereby making it possible to obtain a more powerful video image. Therefore, the configuration increases the maximum brightness of the variable light source 5210 by putting it in over-drive only when displaying a scene (i.e., a frame) in which, for example, only a small part of a screen is very bright, or the like, as described above. This is particularly advantageous it avoids a continuous setup of the maximum brightness, which adversely affects the durability of the variable light source 5210.

Note that the present invention can be modified in various ways within the scope of the configurations illustrated in the above-described preferred embodiments.

Although the present invention has been described in terms of the presently preferred embodiment, it is to be understood that such disclosure is not to be interpreted as limiting. Various alternations and modifications will no doubt become apparent to those skilled in the art after reading the above disclosure. The present invention may be changed in various manners possible within the scope of the present invention, and is not limited to the configurations exemplified in the above-described embodiments. Accordingly, it is intended that the appended claims be interpreted as covering all alternations and modifications as fall within the true spirit and scope of the invention.

What is claimed is:

1. A projection apparatus, comprising:
a light source;
a light source control unit for controlling output of the light source;
at least one spatial light modulator for modulating illumination light from the light source by a plurality of pixel elements; and
an optical system for projecting, to a screen, the illumination light deflected by the spatial light modulator, wherein the light source control unit receives input image data from an external image source and performs a gamma (γ) correction on the input image data by a modulation control of the light source.

2. The projection apparatus according to claim 1, wherein:
the light source control unit modulates the illumination light by making an intensity of the illumination light variable.

3. The projection apparatus according to claim 1, wherein:
the light source control unit modulates the illumination light by making an emission pulse interval of pulse emission of the light source variable.

4. The projection apparatus according to claim 1, wherein:
the light source control unit modulates the illumination light by making an emission pulse interval of pulse emission of the light source constant and by making emission pulse width variable.

5. The projection apparatus according to claim 1, wherein:
the light source control unit modulates the illumination light by making an emission pulse interval and emission pulse width of pulse emission of the light source variable.

6. The projection apparatus according to claim 1, wherein:
the light source control unit modulates the illumination light by making at least one of an emission pulse interval, emission pulse width, and an emission pulse intensity of pulse emission of the light source variable.

7. The projection apparatus according to claim 1, wherein:
the gamma correction is individually performed for each color of the illumination light.

8. The projection apparatus according to claim 1, wherein:
the spatial light modulator comprises a micromirror device in which a plurality of mirror elements for deflecting light from the light source are arranged.

9. The projection apparatus according to claim 1, wherein:
the light source is a light emitting diode (LED) or a laser device.

10. A projection apparatus, comprising:
a light source;
a light source control unit receiving input image data from an external image source for controlling output of the light source;
a gamma corrector for performing a first gamma correction on the input image data received from the light source control unit;
at least one spatial light modulator for modulating illumination light from the light source by a plurality of pixel elements; and
an optical system for projecting, to a screen, the illumination light deflected by the spatial light modulator, wherein the light source control unit further performs a second gamma (γ) correction by a modulation control of the light source after the gamma corrector performs the first gamma correction.

11. The projection apparatus according to claim 10, wherein:
the light source control unit modulates the illumination light by making an intensity of the illumination light variable.

12. The projection apparatus according to claim 10, wherein:
the light source control unit modulates the illumination light by making an emission pulse interval of pulse emission of the light source variable.

13. The projection apparatus according to claim 10, wherein:
the light source control unit modulates the illumination light by making an emission pulse interval of pulse emission of the light source constant and by making emission pulse width variable.

14. The projection apparatus according to claim 10, wherein:
the light source control unit modulates the illumination light by making an emission pulse interval and emission pulse width of pulse emission of the light source variable.

15. The projection apparatus according to claim 10, wherein:
the light source control unit modulates the illumination light by making at least one of an emission interval, emission pulse width, and an emission pulse intensity of pulse emission of the light source variable.

16. The projection apparatus according to claim 10, wherein:
the first gamma correction is individually performed for each color of the illumination light.

17. The projection apparatus according to claim 10, wherein:
the spatial light modulator comprises a micromirror device in which a plurality of mirror elements for deflecting light from the light source are arranged.

18. The projection apparatus according to claim 10, wherein:
the light source is a light emitting diode (LED) or a laser device.

19. A projection apparatus, comprising:
a light source;
a light source control unit receiving input image data from an external image source for controlling output of the light source;
at least one spatial light modulator for modulating illumination light from the light source by a plurality of pixel elements;
an image analyzer for analyzing the input image data; and
an optical system for projecting, to a screen, the illumination light deflected by the spatial light modulator, wherein the light source control unit performs a gamma (γ) correction on the input image data by performing a modulation control of the light source on the basis of output of the image analyzer.

20. The projection apparatus according to claim 19, wherein:
the light source control unit modulates the illumination light by making an intensity of the illumination light variable.

21. The projection apparatus according to claim 19, wherein:
the light source control unit modulates the illumination light by making an emission pulse interval of pulse emission of the light source variable.

22. The projection apparatus according to claim 19, wherein:

the light source control unit modulates the illumination light by making an emission pulse interval of pulse emission of the light source constant and by making emission pulse width variable.

23. The projection apparatus according to claim 19, wherein:

the light source control unit modulates the illumination light by making an emission pulse interval and emission pulse width of pulse emission of the light source variable.

24. The projection apparatus according to claim 19, wherein:

the light source control unit modulates the illumination light by making at least one of an emission pulse interval, emission pulse width, and an emission pulse intensity of pulse emission of the light source variable.

25. The projection apparatus according to claim 19, wherein:

the gamma correction is individually performed for each color of the illumination light.

26. The projection apparatus according to claim 19, wherein:

the spatial light modulator comprises a micromirror device in which a plurality of mirror elements for deflecting light from the light source are arranged.

27. The projection apparatus according to claim 19, wherein:

the light source is a light emitting diode (LED) or a laser device.

28. A projection apparatus, comprising:

a light source;

a light source control unit for controlling output of the light source;

at least one spatial light modulator for modulating illumination light from the light source by a plurality of pixel elements; and an optical system for projecting, to a screen, the illumination light deflected by the spatial light modulator, wherein the light source control unit receives input image data from an external image source and performs a nonlinear correction on the input image data by a modulation control of the light source.

29. A projection apparatus, comprising:

a light source;

a light source control unit receiving input image data from an external image source for controlling output of the light source;

at least one spatial light modulator for modulating illumination light from the light source by a plurality of pixel elements;

an image analyzer for analyzing the input image data; and an optical system for projecting, to a screen, the illumination light deflected by the spatial light modulator, wherein the light source control unit performs a nonlinear correction on the input image data by a modulation control of the light source based on output generated by the image analyzer.

* * * * *